US008730970B2

(12) United States Patent
Allison et al.

(10) Patent No.: US 8,730,970 B2
(45) Date of Patent: May 20, 2014

(54) METHODS SYSTEMS, AND COMPUTER PROGRAM PRODUCTS FOR PROVIDING VOICEMAIL ROUTING INFORMATION IN A NETWORK THAT PROVIDES CUSTOMIZED VOICEMAIL SERVICES

(75) Inventors: Rick L. Allison, Cary, NC (US); Apirux Bantukul, Cary, NC (US); Peter J. Marsico, Chapel Hill, NC (US)

(73) Assignee: Tekelec Global, Inc., Morrisville, CA (US)

( * ) Notice: Subject to any disclaimer, the term of this patent is extended or adjusted under 35 U.S.C. 154(b) by 1261 days.

(21) Appl. No.: 11/891,677

(22) Filed: Aug. 10, 2007

(65) Prior Publication Data

US 2008/0205603 A1 Aug. 28, 2008

Related U.S. Application Data

(60) Provisional application No. 60/903,185, filed on Feb. 23, 2007.

(51) Int. Cl.
*H04L 12/28* (2006.01)

(52) U.S. Cl.
USPC .................. 370/395.2; 370/395.31; 455/413; 379/88.18; 379/88.25; 379/88.27

(58) Field of Classification Search
USPC ............ 370/395.2, 395.3, 395.31; 379/88.18, 379/88.28, 88.26, 88.27; 455/412, 412.2, 455/413
See application file for complete search history.

(56) References Cited

U.S. PATENT DOCUMENTS

| 3,917,915 | A | 11/1975 | Karras |
| 4,162,377 | A | 7/1979 | Mearns |
| 4,191,860 | A | 3/1980 | Weber |
| 4,310,727 | A | 1/1982 | Lawser |
| 4,313,035 | A | 1/1982 | Jordan et al. |
| 4,385,206 | A | 5/1983 | Bradshaw et al. |
| 4,754,479 | A | 6/1988 | Bicknell et al. |
| 4,756,020 | A | 7/1988 | Fodale |
| 4,769,834 | A | 9/1988 | Billinger et al. |

(Continued)

FOREIGN PATENT DOCUMENTS

| EP | 0 088 639 | 9/1983 |
| EP | 0 212 654 | 5/1987 |

(Continued)

OTHER PUBLICATIONS

"BICC Architecture and BICC Protocol Details," Tekelec, p. 28-41 (2008).

(Continued)

*Primary Examiner* — Alvin Zhu
(74) *Attorney, Agent, or Firm* — Jenkins, Wilson, Taylor & Hunt, P.A.

(57) ABSTRACT

Methods, systems, and computer program products for providing voicemail routing information in a network that provides customized voicemail services are disclosed. According to one method, a voicemail routing query is received at an advanced voicemail routing node, where the query includes at least one parameter associated with a voicemail transaction. Based on at least one query parameter, voicemail routing information may be determined that identifies a voicemail server and a voicemail service from among a plurality of voicemail servers, where at least some of the voicemail servers provide different services. A voicemail routing query response may then be generated including the determined voicemail routing information.

49 Claims, 12 Drawing Sheets

(56) References Cited

U.S. PATENT DOCUMENTS

| | | |
|---|---|---|
| 4,788,718 A | 11/1988 | McNabb et al. |
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,150,357 A | 9/1992 | Hopner et al. |
| 5,291,481 A | 3/1994 | Doshi et al. |
| 5,315,580 A | 5/1994 | Phaal |
| 5,341,608 A | 8/1994 | Mains, Jr. |
| 5,402,474 A | 3/1995 | Miller et al. |
| 5,426,688 A | 6/1995 | Anand |
| 5,430,709 A | 7/1995 | Galloway |
| 5,438,570 A | 8/1995 | Karras et al. |
| 5,457,692 A | 10/1995 | Ishinabe et al. |
| 5,457,729 A | 10/1995 | Hamann et al. |
| 5,473,596 A | 12/1995 | Garafola et al. |
| 5,475,732 A | 12/1995 | Pester, III |
| 5,506,893 A | 4/1996 | Buscher et al. |
| 5,521,902 A | 5/1996 | Ferguson |
| 5,539,804 A | 7/1996 | Hong et al. |
| 5,546,398 A | 8/1996 | Tucker et al. |
| 5,550,914 A | 8/1996 | Clarke et al. |
| 5,572,579 A | 11/1996 | Orriss et al. |
| 5,579,371 A | 11/1996 | Aridas et al. |
| 5,583,926 A | 12/1996 | Venier et al. |
| 5,586,177 A | 12/1996 | Farriss et al. |
| 5,592,530 A | 1/1997 | Brockman et al. |
| 5,598,464 A | 1/1997 | Hess et al. |
| 5,602,909 A | 2/1997 | Carkner et al. |
| 5,606,600 A | 2/1997 | Elliott et al. |
| 5,610,969 A | 3/1997 | McHenry et al. |
| 5,610,977 A | 3/1997 | Williams et al. |
| 5,625,681 A | 4/1997 | Butler, II |
| 5,671,225 A | 9/1997 | Hooper et al. |
| 5,689,555 A | 11/1997 | Sonnenberg |
| 5,696,816 A | 12/1997 | Sonnenberg |
| 5,711,011 A * | 1/1998 | Urs et al. ................ 455/520 |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,812,639 A | 9/1998 | Bartholomew et al. |
| 5,838,683 A | 11/1998 | Corley et al. |
| 5,867,558 A | 2/1999 | Swanson |
| 5,903,726 A | 5/1999 | Donovan et al. |
| 5,949,871 A | 9/1999 | Kabay et al. |
| 5,999,525 A | 12/1999 | Krishnaswamy et al. |
| 6,006,098 A | 12/1999 | Rathnasabapathy et al. |
| 6,009,160 A | 12/1999 | Sonnenberg |
| 6,021,126 A | 2/2000 | White et al. |
| 6,028,914 A | 2/2000 | Lin et al. |
| 6,061,432 A | 5/2000 | Wallace et al. |
| 6,091,957 A | 7/2000 | Larkins et al. |
| 6,091,959 A | 7/2000 | Souissi et al. |
| 6,094,573 A | 7/2000 | Heinonen et al. |
| 6,097,719 A | 8/2000 | Benash et al. |
| 6,097,960 A | 8/2000 | Rathnasabapathy et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,754 A | 9/2000 | Landgren |
| 6,119,014 A | 9/2000 | Alperovich et al. |
| 6,122,510 A | 9/2000 | Granberg |
| 6,128,304 A | 10/2000 | Gardell et al. |
| 6,128,377 A | 10/2000 | Sonnenberg |
| 6,134,307 A | 10/2000 | Brouckman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,134,618 A | 10/2000 | Hebert |
| 6,137,869 A | 10/2000 | Voit et al. |
| 6,138,023 A | 10/2000 | Agarwal et al. |
| 6,181,937 B1 | 1/2001 | Joensuu |
| 6,182,086 B1 | 1/2001 | Lomet et al. |
| 6,188,752 B1 | 2/2001 | Lesley |
| 6,215,790 B1 | 4/2001 | Voit et al. |
| 6,219,551 B1 | 4/2001 | Hentilä et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,301,609 B1 | 10/2001 | Aravamudan et al. |
| 6,304,565 B1 | 10/2001 | Ramamurthy |
| 6,321,268 B1 | 11/2001 | Dillon et al. |
| 6,324,183 B1 | 11/2001 | Miller et al. |
| 6,333,931 B1 | 12/2001 | LaPier et al. |
| 6,359,979 B1 | 3/2002 | Wang et al. |
| 6,363,411 B1 | 3/2002 | Dugan et al. |
| 6,373,930 B1 | 4/2002 | McConnell et al. |
| 6,393,269 B1 | 5/2002 | Hartmaier et al. |
| 6,424,621 B1 | 7/2002 | Ramaswamy et al. |
| 6,430,176 B1 | 8/2002 | Christie, IV |
| 6,434,155 B1 | 8/2002 | Jones et al. |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,496,690 B1 | 12/2002 | Cobo et al. |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,574,481 B1 | 6/2003 | Rathnasabapathy et al. |
| 6,584,183 B2 | 6/2003 | Manto |
| 6,611,516 B1 | 8/2003 | Pirkola et al. |
| 6,633,764 B1 | 10/2003 | Garcia |
| 6,718,178 B1 | 4/2004 | Sladek et al. |
| 6,731,741 B1 | 5/2004 | Fourcand et al. |
| 6,747,970 B1 | 6/2004 | Lamb et al. |
| 6,760,343 B1 | 7/2004 | Krishnamurthy et al. |
| 6,795,532 B1 | 9/2004 | Gross et al. |
| 6,836,477 B1 | 12/2004 | West et al. |
| 6,865,266 B1 | 3/2005 | Pershan |
| 6,917,612 B2 | 7/2005 | Foti et al. |
| 6,944,666 B2 | 9/2005 | Belkin |
| 6,963,583 B1 | 11/2005 | Foti |
| 6,968,052 B2 | 11/2005 | Wullert, II |
| 7,010,114 B2 | 3/2006 | Stahl et al. |
| 7,058,036 B1 | 6/2006 | Yu et al. |
| 7,079,853 B2 | 7/2006 | Rathnasabapathy et al. |
| 7,254,391 B2 * | 8/2007 | McCann ................ 455/433 |
| 7,260,207 B2 | 8/2007 | Marsico |
| 7,864,752 B1 | 1/2011 | Bennett et al. |
| 2001/0031641 A1 | 10/2001 | Ung et al. |
| 2001/0034224 A1 | 10/2001 | McDowell et al. |
| 2001/0040957 A1 | 11/2001 | McCann et al. |
| 2002/0029189 A1 | 3/2002 | Titus et al. |
| 2002/0048360 A1 | 4/2002 | Zambre et al. |
| 2002/0058507 A1 | 5/2002 | Valentine et al. |
| 2002/0111153 A1 | 8/2002 | Hartmaier et al. |
| 2002/0136206 A1 * | 9/2002 | Gallant et al. ................ 370/352 |
| 2002/0150079 A1 | 10/2002 | Zabawskyj et al. |
| 2003/0026289 A1 | 2/2003 | Mukherjee et al. |
| 2003/0031160 A1 | 2/2003 | Gibson Ang et al. |
| 2003/0037108 A1 | 2/2003 | Peiffer et al. |
| 2003/0177281 A1 | 9/2003 | McQuillan et al. |
| 2003/0203740 A1 | 10/2003 | Bahl et al. |
| 2004/0003037 A1 | 1/2004 | Fujimoto et al. |
| 2004/0024894 A1 | 2/2004 | Osman et al. |
| 2004/0047341 A1 | 3/2004 | Staack et al. |
| 2004/0121761 A1 | 6/2004 | Tripathy et al. |
| 2004/0153506 A1 | 8/2004 | Ito et al. |

(56) References Cited

U.S. PATENT DOCUMENTS

| | | | |
|---|---|---|---|
| 2004/0155757 A1* | 8/2004 | Litwin et al. | 340/310.01 |
| 2004/0264671 A1 | 12/2004 | Lamberton et al. | |
| 2005/0027867 A1 | 2/2005 | Mueller et al. | |
| 2005/0053223 A1 | 3/2005 | Bedingfield | |
| 2005/0070310 A1 | 3/2005 | Caspi et al. | |
| 2005/0091157 A1* | 4/2005 | Suzuki et al. | 705/40 |
| 2005/0111632 A1 | 5/2005 | Caputo et al. | |
| 2005/0113095 A1 | 5/2005 | Allison | |
| 2005/0201362 A1* | 9/2005 | Klein et al. | 370/352 |
| 2005/0202836 A1 | 9/2005 | Schaedler et al. | |
| 2005/0213740 A1* | 9/2005 | Williams et al. | 379/211.02 |
| 2006/0029045 A1 | 2/2006 | Kobayashi et al. | |
| 2006/0077965 A1 | 4/2006 | Garcia-Martin et al. | |
| 2006/0105766 A1 | 5/2006 | Azada et al. | |
| 2006/0177012 A1 | 8/2006 | Forney et al. | |
| 2006/0210027 A1* | 9/2006 | Kafri | 379/88.13 |
| 2006/0244744 A1* | 11/2006 | Kandori et al. | 345/418 |
| 2010/0202446 A1 | 8/2010 | McCann et al. | |

FOREIGN PATENT DOCUMENTS

| | | |
|---|---|---|
| EP | 0 258 654 | 3/1988 |
| EP | 0 264 023 | 4/1988 |
| EP | WO 00/16583 | 3/2000 |
| EP | 1 100 279 A2 | 5/2001 |
| GB | 2 382 267 | 5/2003 |
| JP | 58-215164 | 12/1983 |
| JP | 62-200859 | 9/1987 |
| KR | 1020030025024 A | 3/2003 |
| WO | WO 84/01073 | 3/1984 |
| WO | WO 86/03915 | 7/1986 |
| WO | WO 88/00419 | 1/1988 |
| WO | WO 97/33441 | 9/1997 |
| WO | WO 99/14910 | 3/1999 |
| WO | WO 00/22543 | 4/2000 |
| WO | WO 00/35155 A1 | 6/2000 |
| WO | WO 01/20920 | 3/2001 |
| WO | WO 01/56308 A2 | 8/2001 |
| WO | WO 2004/084530 A1 | 9/2004 |
| WO | WO 2005/083995 A1 | 9/2005 |
| WO | WO 2006/031678 A2 | 3/2006 |
| WO | WO 2008/103371 | 8/2008 |

OTHER PUBLICATIONS

"BICC Signaling Router (BSR) Reference Architecture (WP005274)," Tekelec, p. 2-91 (2008).
"GPRS Tunneling Protocol (GTP)," Trillium, Continuous Computing, pp. 1-3 (Copyright 2007).
"Gateway Control Protocol: Version 3," Series H: Audiovisual and Multimedia Systems; Infrastructure of Audiovisual Services—Communication Procedures, ITU-T H.248.1 (Sep. 2005).
Faltstrom et al., "The E.164 to Uniform Resource Identifiers (URI) Dynamic Delegation Discovery System (DDDS) Application (ENUM)," www.ietf.org, pp. 1-16 (Apr. 2004).
"Interworking Between Session Initiation Protocol (SIP) and Bearer Independent Call Control Protocol or ISDN User Part," ITU-T Q.1912.5, p. 1-101 (Mar. 2004).
"Services and Protocols for Advanced Networks (SPAN); Bearer Independent Call Control (BICC) Capability Set 2 (CS2); Protocol Specification," ETSI EN 302 213 V1.1.2 (Jan. 2004).
"Telecommunications and Internet Protocol Harmonization Over Networks (TIPHON) Release 4; Technology Mapping; Implementation of TIPHON Architecture Using BICC," ETSI TS 102 228 V4.1.1 (Nov. 2003).
Camarillo et al., "Mapping of Integrated Services Digital Network (ISDN) User Part (ISUP) Overlap Signalling to the Session Initiation Protocol (SIP)," Network Working Group, RFC 3578 (Aug. 2003).
"Series Q: Switching and Signalling; Broadband ISDN—Signalling ATM Adaptation Layer (SAAL); Signalling Transport converter on SCTP," ITU-T Q.2150.3 (Dec. 2002).
"Bearer Independent Call Bearer Control Protocol," ITU-T Q.1950, p. 1-96 (Dec. 2002).
Camarillo et al., "Integrated Services Digital Network (ISDN) User Part (ISUP) to Session Initiation Protocol (SIP) Mapping," Network Working Group, RFC 3398 (Dec. 2002).
Vemuri et al., "Session Initiation Protocol for Telephones (SIP-T): Context and Architectures," Network Working Group, RFC 3372 (Sep. 2002).
Chang, "BICC Extension of SIP in Inter-Network Configuration," Internet Engineering Task Force, draft-chang-sipping-bicc-network-00.txt, pp. 1-17 (Mar. 2002).
Multiservice Switching Forum, "Implementation Agreement or BICC," MSF-IA-BICC.001-FINAL (Feb. 2002).
Marshall et al., "SIP Extensions for Supporting Distributed Call State," SIP Working Group, Internet Draft, pp. 1-12 (Aug. 2001).
"Searles Q: Switching and Signalling; Specification of Signalling Related to Bearer Independent. Call Control (BICC); Bearer Independent Call Control Protocol (Capability Set 2): Basic Call Procedures," ITU-T Q1902.4 (Jul. 2001).
"Bearer Independent Call Control Protocol (Capability Set 2) and Signalling System No. 7 ISDN User Part: Formats and Codes," ITU-T Q.1902.3, p. 1-141 (Jul. 2001).
"Bearer Independent Call Control Protocol (Capability Set 2) and Signaling System No. 7 ISDN user part: General Functions of Messages and Parameters," ITU-T Q.1902.2 (Jul. 2001).
"Bearer Independent Call Control Protocol (Capability Set 2): Functional Description," ITU-T Q.1902.1, p. 1-23 (Jul. 2001).
"Series Q: Switching and Signalling, Specification of Signalling Related to Bearer Independent Call Control (BICC); BICC Bearer Control Tunnelling Protocol," ITU-T Q.1990 (Jul. 2001).
"Series Q: Switching and Signalling; Specifications of Signalling System No. 7—ISDN User Part; Signalling System No. 7—Application Transport Mechanism: Bearer Independent Call Control (BICC); Amendment 1: Bearer Independent Call Control Capability Set 2," ITU-T Q.765.5 (Jul. 2001).
"Series Q: Switching and Signalling; Specifications of Signalling Related to Bearer Independent Call Control (BICC): Interworking Between Signalling System No. 7 ISDN User Part and the Bearer Independent Call Control Protocol," ITU-T Q1912.1 (Jul. 2001).
"Series Q: Switching and Signalling; Interworking Between Selected Signalling Systems (PSTN Access, DSS1, C5, R1, R2, TUP) and the Bearer Independent Call Control Protocol," ITU-T Q1912.2 (Jul. 2001).
"Signalling Transport Converter on MTP3 and MTP3b," ITU-T Q.2150.1 (May 2001).
"Generic Signalling Transport Service," ITU-T Q.2150.0 (May 2001).
"ITU-Q1970: Draft New ITU-T Recommendation Q.1970 BICC IP Bearer Control Protocol," Network Dictionary (2001).
"Gateway Control Protocol: Transport Over Stream Control Transmission Protocol (SCTP)," Series H: Audiovisual and Multimedia Systems; Infrastructure of Audiovisual Services—Communication Procedures, H.248.4 (Nov. 2000).
"Bearer Independent Call Control Protocol," ITU-T Q.1901 (Jun. 2000).
Sugano et al., "Presence Information Data Format for IMPP," Internet draft, draft-ietf-impp-pidf-01.text, Network Working Group, p. 1-17, (Mar. 10, 2000).
"Signalling System No. 7—ISDN User Part Enhancements for the Support of Number Portability," ITU-T Q.769.1 (Dec. 1999).
"Signalling System No. 7—ISDN User Part Formats and Codes," ITU-T Q.763 (Dec. 1999).
"Signalling System No. 7—ISDN User Part General Functions of Messages and Signals," ITU-T Q.762 (Dec. 1999).
"Signalling System No. 7—ISDN User Part Functional Description," ITU-T Q.761 (Dec. 1999).
"Series Q: Switching and Signalling; Specifications of Signalling System No. 7—ISDN Supplementary Services; ISDN User Part Supplementary Services," ITU-T Q.730 (Dec. 1999).
Liao et al., "SS7-TCAP/IP Interworking," Internet Engineering Task Force, pp. 1-14 (Mar. 1999).
De Ment, "The Evolution of Signaling," NMS Communications, p. 1-28 (Publication Date Unknown).

(56) References Cited

OTHER PUBLICATIONS

"Mobile Wireless Overview," Cisco IOS Mobile Wireless Configuration Guide, pp. MWC-1-MWC-8 (Publication Date Unknown).
Jennings et al., "Session Initiation Protocol (SIP) URIs for Applications such as Voicemail and Interactive Voice Response (IVR)," The Internet Society (Apr. 2006).
Notification of Transmittal of the International Search Report and the Written Opinion of the International Searching Authority, or the Declaration for International Application No. PCT/US08/02220 (Jul. 8, 2008).
Non-Final Official Action for U.S. Appl. No. 12/689,702 (Feb. 2, 2012).
First Office Action for Chinese Patent Application No. 200880012885.X (Jan. 11, 2012).

Notification of Transmittal of the International Search Report and the Written Opinion of the International Searching Authority, or the Declaration for International Application No. PCT/US2010/021374 (Aug. 19, 2010).
Applicant-Initiated Interview Summary for U.S. Appl. No. 12/689,702 (Jun. 5, 2012).
Decision of Rejection for Chinese Patent Application No. 200880012885.X (May 6, 2013).
Second Office Action for Chinese Application No. 200880012885.X (Sep. 27, 2012).
Extended European Search Report for European Application No. 08725814.1 (Sep. 23, 2013).
Final Office Action for U.S. Appl. No. 12/689,702 (Aug. 15, 2013).

* cited by examiner

| VMSC ID | VMSC INDEX | VM ROUTING NUMBER | |
|---|---|---|---|
| 1 | 1 | 612000589 | ←508 |
|   | 2 | 612000712 | |
|   | 3 | 612000899 | |
|   | 4 | 614000555 | |
|   | 5 | 614000666 | |
|   | 6 | 614000666 | |
|   | 7 | RESERVED | |
|   | 8 | RESERVED | |
|   | 9 | RESERVED | |
|   | 10 | RESERVED | |
| 2 | 1 | 612000590 | |
|   | 2 | 612000713 | ←510 |
|   | 3 | 612000900 | ←512 |
|   | 4 | 614000556 | |
|   | 5 | 614000667 | |
|   | 6 | 614000667 | |
|   | 7 | RESERVED | |
|   | 8 | RESERVED | |
|   | 9 | RESERVED | |
|   | 10 | RESERVED | |
| 3 | 1 | 612000591 | |
|   | 2 | 612000714 | |
|   | 3 | 612000901 | |
|   | 4 | 614000557 | ←514 |
|   | 5 | 614000668 | |
|   | 6 | 614000668 | |
|   | 7 | RESERVED | |
|   | 8 | RESERVED | |
|   | 9 | RESERVED | |
|   | 10 | RESERVED | |
| 999 |   |   | |

502 → VMSC ID
504 → VMSC INDEX
506 → VM ROUTING NUMBER

METHODS SYSTEMS, AND COMPUTER PROGRAM PRODUCTS FOR PROVIDING VOICEMAIL ROUTING INFORMATION IN A NETWORK THAT PROVIDES CUSTOMIZED VOICEMAIL SERVICES

PRIORITY APPLICATIONS

This application claims the benefit of U.S. Provisional Patent Application Ser. No. 60/903,185 filed Feb. 23, 2007, the disclosure of which is incorporated herein by reference in its entirety.

TECHNICAL FIELD

The subject matter described herein relates to voicemail routing. More particularly, the subject matter described herein relates to providing voicemail routing information in a network that provides customized voicemail services.

BACKGROUND

Current voicemail routing systems typically use a range-based mechanism where voicemail (VM) calls are routed to one of several voicemail server centers (VMSCs) in an equal load-sharing scheme. For example, in an exemplary network including multiple conventional VMSCs, each VMSC may be assigned a range of subscribers. Subscribers may be identified by a subscriber identifier, such as mobile station ISDN number (MSISDN) or directory number (DN). Therefore, when a VM call arrives at a particular mobile switching center (MSC), the MSC may simply route the voicemail call to a VMSC based on the subscriber identifier. By equally dividing subscriber identifiers among multiple VMSCs, current methods load-share voicemail services for all network subscribers across all available VMSCs.

Current voicemail routing systems also typically provision each VMSC with the same set of voicemail services, regardless of whether the distribution of users requiring those services is uniform. Yet with the introduction of premium voicemail services, such as video-voicemail and multimedia-voicemail, network operators employing conventional voicemail routing systems must either upgrade all of their existing VMSCs or forgo these advanced services. For example, in an exemplary network containing multiple VMSCs providing standard voicemail services, all VMSCs in the network must be upgraded in order to provide premium voicemail services to a minority of subscribers.

Therefore, one problem associated with current voicemail routing systems is the inability assign subscribers to VMSCs on an individual basis. Moreover, because the desire for premium voicemail services is unevenly distributed throughout the customer base, yet VMSCs must be identically provisioned, network operators must either over-provision or under-provision voicemail server resources, thereby incurring added inefficiency and expense.

Accordingly, a need exists for improved methods, systems, and computer program products for providing voicemail routing information in a network that provides customized voicemail services.

SUMMARY

According to one aspect, the subject matter described herein comprises methods, systems, and computer program products for providing voicemail routing information in a network that provides customized voicemail services. One method includes receiving a voicemail routing query at an advanced voicemail routing node, where the query includes at least one parameter associated with a voicemail transaction. Based on at least one query parameter, voicemail routing information may be determined that identifies a voicemail server. In one implementation, the voicemail server may be identified from a plurality of voicemail servers, where at least some of the voicemail servers provide different services. A voicemail routing query response may then be generated including the determined voicemail routing information.

The term "advanced voicemail routing node," as used herein, refers to a node that provides or obtains voicemail routing information and that routes signaling messages. The voicemail routing information obtained by the advanced voicemail routing node may be voicemail routing information that identifies a specific voicemail server or service in a network that provides plural voicemail servers or services. In one example, the network may include a plurality of non-identically provisioned voicemail servers and the voicemail routing information may identify a specific voicemail server from the non-identically provisioned voicemail servers. In an alternate implementation, the network may include a plurality of identically provisioned voicemail servers where different subscribers are assigned to different servers, and the voicemail routing information may identify the voicemail server from the identically provisioned voicemail servers to which a subscriber is assigned.

According to another aspect, an advanced voicemail routing node may include a communications module configured to receive a voicemail routing query, and a voicemail routing module configured to determine voicemail routing information based on at least one voicemail routing query parameter and to generate a voicemail routing query response including a determined voicemail routing information. The voicemail routing query may include at least one parameter associated with a voicemail transaction and voicemail routing information may identify a voicemail server. In one implementation, the voicemail server may be identified from a plurality of voicemail servers where at least some of the voicemail servers provide different services.

The subject matter described herein for may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 5 is an exemplary table for associating voicemail server IDs and voicemail service indexes with a voicemail routing number according to an embodiment of the subject matter described herein;

DETAILED DESCRIPTION

Figure 1:
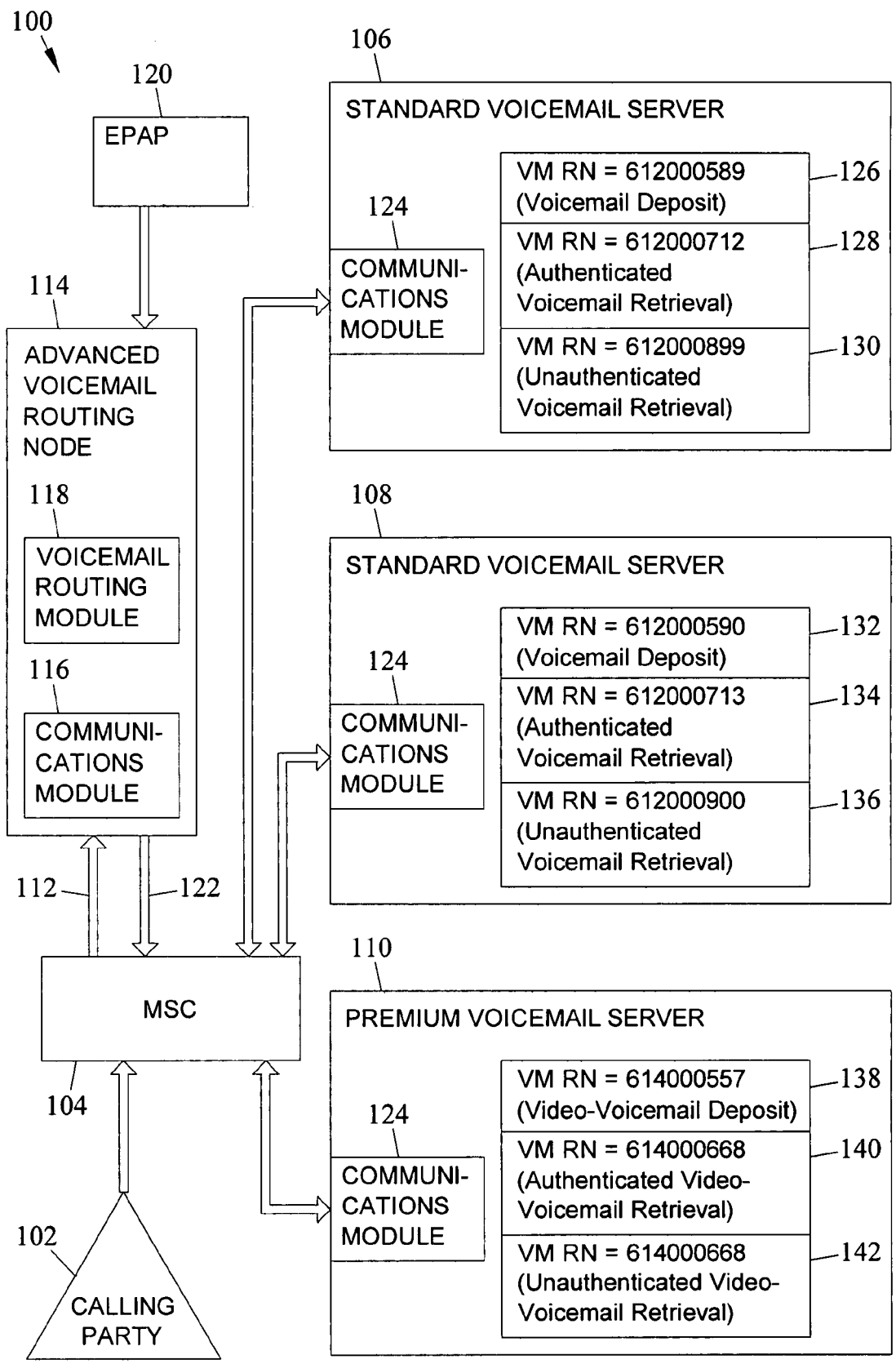
FIG. 1 is a block diagram of an exemplary system for providing voicemail routing information in a network that provides customized voicemail services according to an embodiment of the subject matter described herein.

FIG. 1 is a block diagram of an exemplary system for providing voicemail routing information in a network that provides customized voicemail services according to an embodiment of the subject matter described herein. Referring to FIG. 1, network 100 includes a calling party 102 that initiates a voicemail transaction with MSC 104. In order to complete the voicemail transaction, MSC 104 may connect calling party 102 to one of voicemail server centers (VMSCs) 106-110. In FIG. 1, VMSCs 106 and 108 are standard voicemail servers configured to provide standard voicemail services, such as voicemail deposit and retrieval. VMSC 110 is a premium voicemail server configured to provide premium voicemail services, such as video-voicemail deposit and retrieval. In order to determine which VMSC 106-110 to route the call to, MSC 104 may generate voicemail routing query 112. Query 112 may be sent to advanced voicemail routing node 114, which determines voicemail routing information based on information contained in query 112.

Advanced voicemail routing query 112 may include, for example, the calling party number, the dialed number, and the voice/video capabilities of calling party 102. Query 112 may then be received by communications module 116, which communicates with voicemail routing module 118. Voicemail routing module 118 may use the information contained in query 118 to search one or more tables for voicemail routing information associated with the call. These tables may be provisioned by an external database, such as one located on external provisioning and application processor (EPAP) node 120. Upon determining voicemail routing information associated with the call, voice mail routing module 118 may generate a voicemail routing query response 122 and forward the response to communications module 116, which sends the response over an external signaling link. Voicemail routing response 122 may be received by MSC 104 and used to connect calling party 102 to one of VMSCs 106-110 by communicating with one of communications modules 124 located on each VMSC 106-110. Communications modules 124 may then use the voicemail routing information to route calling party 102 to one of voicemail services 126-142.

In FIG. 1, voicemail services 126-136 may be associated with standard voicemail services, such as voice-only voicemail, and voicemail services 138-142 may be associated with premium voicemail services, such as video-voicemail. For example, voicemail service 126 may correspond to a standard voicemail deposit, voicemail service 128 may correspond to an authenticated voicemail retrieval, and voicemail service 130 may correspond to an authenticated voicemail retrieval. Similarly, voicemail service 138 may correspond to a video-voicemail deposit, voicemail service 140 may correspond to an authenticated video-voicemail retrieval, and voicemail service 142 may correspond to an authenticated video-voicemail retrieval.

In the embodiment illustrated in FIG. 1, calling party 102 may be connected to standard voicemail server 106 if information contained in voicemail routing query 112 indicates that a standard voicemail transaction has been provisioned for calling party 102. In another example, calling party 102 may be connected to premium voicemail server 110 if information contained in voicemail routing query 112 indicates that a premium voicemail service has been provisioned for calling party 102. Such premium voicemail services may include a video-voicemail deposit if the calling party 102 is capable of generating a video-voicemail message.

In one exemplary implementation, voicemail routing module 118 may examine a call condition in addition to subscriber identification information in a voice mail query to determine the VMSC and service to which a call should be routed. For example, voicemail routing module may determine from parameters in the query message whether a voice mail deposit or retrieval is being made. If a deposit is being made, routing information may be returned that indicates the VMSC provisioned to receive voice mail deposits for the called party. If a retrieval is being made, routing information may be returned that indicates the VMSC provisioned to store voice mail messages for the calling party.

Figure 2:
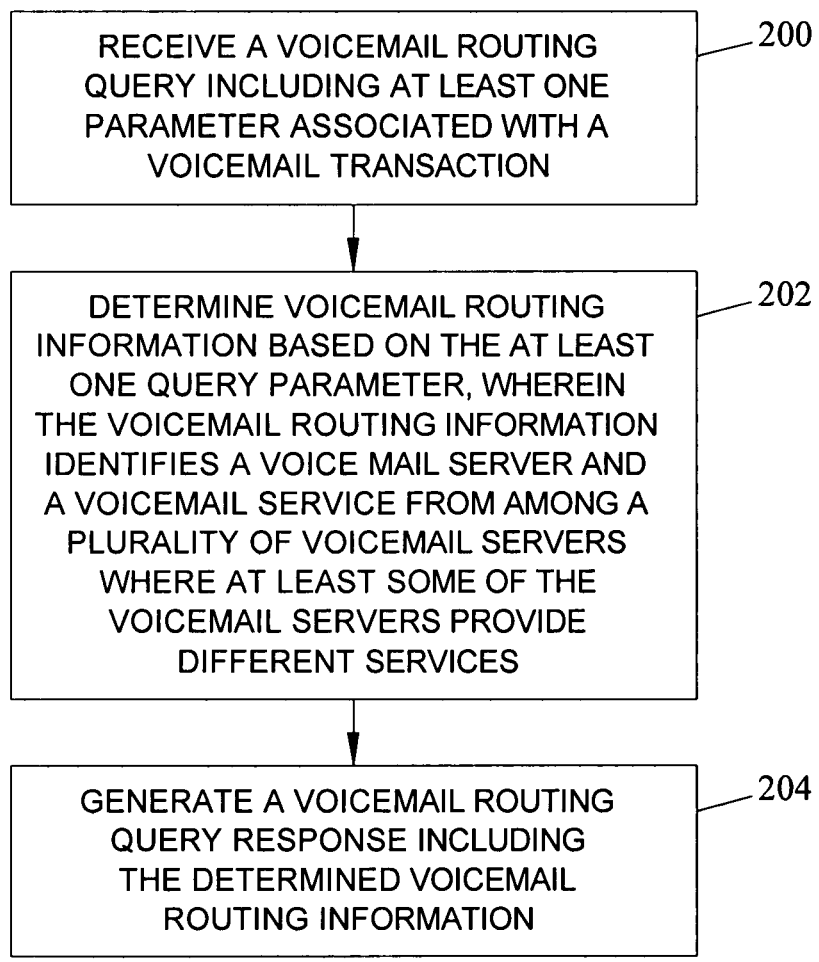
FIG. 2 is a flow chart of an exemplary process for providing voicemail routing information in a network that provides customized voicemail services according to an embodiment of the subject matter described herein.

FIG. 2 is a flow chart of an exemplary process for providing voicemail routing information in a network that provides customized voicemail services according to an embodiment of the subject matter described herein. Referring to FIG. 2, in block 200, a voicemail routing query may be generated by a network node, such as MSC 104. For example, voicemail routing query 112 may include various parameters associated with the voicemail transaction, which may be used by voicemail routing module 118 to determine the voicemail routing information to be included in voicemail routing response 122. Exemplary voicemail routing query parameters are illustrated in Table 1 below.

TABLE 1

Exemplary Voicemail Routing Query Parameters

| Message Parameter | Expected Value |
|---|---|
| MTP OPC | PC of MSC/VLR |
| MTP DPC | PC of voice mail routing node (VMRN) |
| SCCP CgPA | Don't Care (should be CgPA info for MSC/VLR) |
| SCCP CdPA | VMRN GTA if RI = route-on-GT; VMRN PC and Voice mail routing module SSN if RI = route-on-DPC/SSN |
| INAP CdPN, or CAP CdPBCDN | Designated Voice Mail Number (true or virtual), or; Designated Voice Mail Prefix + called subscriber's MSISDN |
| INAP/CAP CgPN | MSISDN if VM retrieval call; Don't Care if VM deposit |
| INAP/CAP RDI (Redirect Indicator) | 1 if call has been redirected – indicates VM deposit; 0 if call has not been redirected – indicates VM retrieval or direct dial VM deposit |
| INAP/CAP OCN (Original Called Number) | MSISDN digits to search with if RDI = 1 (call redirected to VM); Don't Care if RDI = 0 (call not redirected to VM) |
| INAP/CAP RDN (Redirecting Dialed Number) | MSISDN digits to search with if RDI = 1 and no OCN (call redirected to VM); Don't Care if RDI = 0 (call not redirected to VM) |
| INAP/CAP Bearer Capabilities | Determines the type of mail – for example voice, video, multimedia, etc. |

Referring to Table 1, exemplary voicemail routing query 112 may include a message transfer part (MTP) originating point code (OPC) and a destination point code (DPC) associated with the query originator and query destination, respectively. For example, the OPC may identify MSC 104 and the DPC may identify advanced voicemail routing node 114. Query 112 may further include a signaling connection and control part (SCCP) calling party identifier (CgPA) and called party identifier (CdPA). The SCCP CdPA may also be used to identify advanced voicemail routing node 114. However, the SCCP CdPA may by identify node 114 by global title address (GTA) or by point code (PC) and subsystem number (SSN) depending on whether "route-on-GT" or "route-on-PC/SSN" is used.

Query 112 may also include a parameter containing either an intelligent network application part (INAP) called party number (CdPN) associated with a voicemail number, or a customized applications for mobile networks enhances logic (CAMEL) application part (CAP) called party identifier associated with a voicemail prefix+MSISDN. A similar parameter may be included for the INAP/CAP calling party number (CgPN).

The INAP/CAP information in the query may include the MSISDN digits, which may be used to identify the subscriber (calling or called party) and the call condition (deposit or retrieval). For example, query 112 may include an INAP or CAP redirect indicator (RDI) indicating whether or not the call has been redirected. For example, an RDI=1 may indicate that the call has been redirected and is therefore associated with a voicemail deposit. And an RDI=0 may indicate that the call has not been redirected, and therefore may be associated with a voicemail deposit or retrieval transaction, depending on the values of other parameters that may be included in query 112. Query 112 may also include an INAP/CAP original called number (OCN) or redirecting dialed number (RDN) that may be used to determine an MSISDN if the call is redirected. An OCN may be included in query 112 depending on a number of factors and an RDN may be included when no OCN exists.

Finally, query 112 may include an INAP/CAP bearer capabilities indicator. The bearer capabilities indicator specifies, for example, whether the calling party is capable of performing a standard voicemail transaction or whether it is capable of also performing advanced voicemail transactions, such as video-voicemail deposits and retrievals. For standard voicemail transactions, the bearer capabilities parameter may include the text string "3.1 kHz audio". Alternatively, for premium video-voicemail transactions, the bearer capabilities parameter may include the string "64 kb/s unified display interface (UDI) video".

It is appreciated that voicemail routing query 112 may include an international telecommunication union (ITU) European telecommunications standards institute (ETSI) intelligent network application part (INAP) initial detection point (IDP) query or a third generation partnership project 3GPP customized applications for mobile networks enhanced logic (CAMEL) application part (CAP) IDP query.

In block 202, voicemail routing information may be determined based on at least one of the plurality of voicemail routing query parameters described in Table 1 above. The voicemail routing information may identify a voicemail server from among a plurality of voicemail servers, where at least some of the voicemail servers are configured to provide different services. The voicemail routing information may also identify a voicemail service from among the various voicemail services provided by a particular VMSC.

In one embodiment, voicemail routing information may be determined by searching one or more tables containing voicemail routing information associated with information like the information contained in voicemail routing query 112. For example, advanced routing node 114 may include three tables, such as Tables 300, 400, and 500, which contain voicemail routing information. In this exemplary embodiment, a first table may contain one or more voicemail server center identifiers (VMSC IDs) associated with one or more subscriber identifiers, such as an MSISDN or DN. Voicemail routing module 118 may search this first table in order to determine the VMSC ID associated with a particular MSISDN. A second table may contain one or more voicemail service indexes (VM Indexes) associated with various call decision criteria. Voicemail routing module 118 may search this second table in order to obtain a VM Index associated with the call, such as a voicemail deposit or voicemail retrieval service. Finally, a third table may contain one or more VMSC IDs and VM Indexes associated with a unique VM routing number (RN). Voicemail routing module 118 may then search this third table in order to determine a VM RN associated with the VMSC ID and VM Index obtained from the first and second tables. The VM RN may then be used by MSC 104 to connect the calling party to the appropriate voicemail server and service.

Returning to the determination made by voicemail routing module 118 of a VMSC ID based on a subscriber identifier, such as an MSISDN, in order to make this determination advanced voicemail routing node 114 may first perform a process hereinafter referred to as "number conditioning" on information contained in query 112 in order to obtain an MSISDN. For example, query 112 typically contains a subscriber identifier used by voicemail routing module 118, such as an MSISDN or DN. However, this subscriber identifier may be located in any one of several different parameters in query 112. The location of the subscriber identifier may be based various factors, such as whether the calling party is roaming. Therefore, advanced voicemail routing node 114 may determine the location of subscriber identifier information included in query 112 based on an examination of these factors, and extract the subscriber identifier from the appropriate parameter location. Once extracted, the subscriber identifier may then be used by voicemail routing module 118 to search Table 300.

Exemplary number conditioning may include examining a voicemail routing query 112 that contains a parameter including both a VM prefix and a MSISDN. This parameter may include a VM prefix and a MSISDN if a first subscriber dials the voicemail number of another subscriber without being redirected. In this situation, node 114 may extract the MSISDN from the parameter by removing the VM prefix. Alternatively, if the calling subscriber has been redirected, as indicated by an RDI=1, node 114 may extract an MSISDN from the OCN or RDN parameters in query 112.

In some situations, node 114 may fail to obtain a valid MSISDN or other subscriber identifier from a parameter in query 112. For example, an invalid MSISDN may result from an attempted voicemail retrieval from a landline phone or an attempted voicemail retrieval from a mobile phone forwarded from a landline phone. In situations where no valid subscriber identifier is obtained, a default subscriber identifier may be used to search Table 300 for an appropriate VMSC ID.

It is appreciated that voicemail routing information may be contained in a single table or distributed across multiple tables without departing from the subject matter described herein. Moreover, any table or tables searched by voicemail routing module 118 may be implemented in software, hardware or any combination thereof.

In block 204, a voicemail routing response may be generated including the voicemail routing information determined in block 202. The voicemail routing response may then be used by the MSC 104 to connect calling party 102 to the voicemail server and voicemail service on that server indicated by the voicemail routing information. For example, advanced voicemail routing node 114 may generate voicemail routing response 122 that includes VM RN=612000589. Therefore, upon receiving voicemail routing response 122, MSC 104 may connect calling party 102 to voicemail deposit service 126 located on standard voicemail server 106 in order to perform a standard voicemail deposit.

Figure 3:
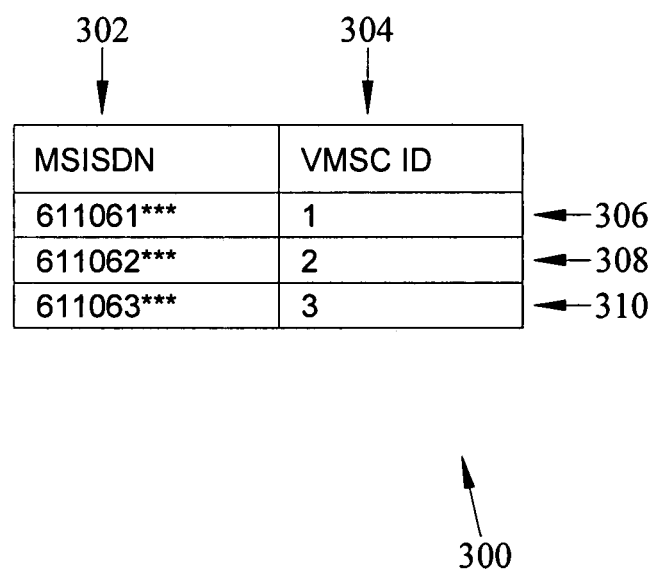
FIG. 3 is an exemplary table for associating one or more subscriber identifiers with a voicemail server ID according to an embodiment of the subject matter described herein.

FIG. 3 is an exemplary table for obtaining a VMSC ID associated with a subscriber identifier, such as an MSISDN, in order to provide voicemail routing information in a network that provides customized VM services according to an embodiment of the subject matter described herein. Because individual subscribers may be associated with either standard or premium voicemail servers, a lookup may be performed in order to determine the VMSC ID associated with a particular subscriber. Table 300 illustrates an exemplary table used by voicemail routing module 118 to determine a VMSC ID associated with a subscriber, as identified by a subscriber identifier.

Table 300 includes one or more subscriber identifiers associated with a VMSC ID. In the embodiment illustrated in FIG. 3, Table 300 may include additional subscriber or call-related information that may be used to locate an associated VMSC ID. For purposes of illustration, column 302 is populated with MSISDN subscriber identifiers which are associated with VMSC IDs located in column 304. The importance of Table 300 rests on its ability to customize the associations with each VMSC, as identified by its VMSC ID, and any other subscriber or call-related information contained in Table 300.

It is appreciated that the exact structure and contents of Table 300 may be determined by the implementation. In one implementation, Table 300 may be created by adding VMSC ID associations to a pre-existing table including one or more subscriber identifiers as well as other information. Such a pre-existing table may be located, for example, on a signaling message network node, such as a signal transfer point (STPs), that may be include advanced voicemail routing module 118.

In order to illustrate the process of obtaining a VMSC ID based on a subscriber identifier obtained from voicemail routing query 112 using Table 300, exemplary scenarios are described below which illustrate conditions for directing a subscriber to different voicemail services within the same voicemail server, or for directing a subscriber to a different voicemail server based on an MSISDN.

In one example, VMSC ID=1 may be obtained corresponding to standard voicemail server 106 based on a search of Table 300 for MSISDN=611061. In this case, it will be appreciated from Table 300 shown in FIG. 3, that for MSISDN=611061, a search of Table 300 results in a match with the first entry, or VMSC ID=1 in record 306.

In another example, VMSC ID=2 may be obtained corresponding to standard voicemail server 108 based on a search of Table 300 for MSISDN=611062. In this case, it will be appreciated from Table 300 shown in FIG. 3, that for MSISDN=611062, a search of Table 300 results in a match with the first entry, or VMSC ID=2 in record 308.

In another example, VMSC ID=3 may be obtained corresponding to premium voicemail server 110 based on a search of Table 300 for MSISDN=611063. In this case, it will be appreciated from Table 300 shown in FIG. 3, that for MSISDN=611063, a search of Table 300 results in a match with the first entry, or VMSC ID=3 in record 310.

It is appreciated that MSISDNs included in Table 300 may be stored in International format which is defined to include a country code (CC)+a national destination code (NDC)+a subscriber number (SN). Table 300 may support individual MSISDN entries and MSISDN range entries comprising 1-15 digits of any hexadecimal value. Table 300 may be searched according to a longest match, best-fit algorithm for any length of entry or range of entries. If no specific individual entry is found matching the search criteria, a range-match search may be performed. In one implementation, table 300 may be arranged to have range-based entries and exception-based entries where the range-based entries correspond to MSISDN ranges and the exception-based entries contain individual MSISDN numbers that are within one of the ranges defined by the range-based entries or outside of all of the ranges defined by the range-based entries. An exception-based entry that contains an MSISDN that is within one of the ranges defined by a range-based entry may have a different VMSC ID provisioned from the corresponding range-based entry. In operation, a lookup may be first performed in table 300 for an exception-based entry that matches an MSISDN in a query message. If the lookup results in a match, the VMSC ID corresponding to the exception-based entry may be extracted. If the lookup fails to result in a match, table 300 may be searched for a range-based entry corresponding to a range within the MSISDN falls. If a matching range-based entry is located, the VMSC ID corresponding to the matching range-based entry is extracted. If no match occurs, an error may be returned, or a default VMSC ID may be returned. After obtaining a VMSC ID in Table 300, node 114 may obtain a VMSC Index using a call decision table, such as Table 400 illustrated in FIG. 4.

Figure 4:
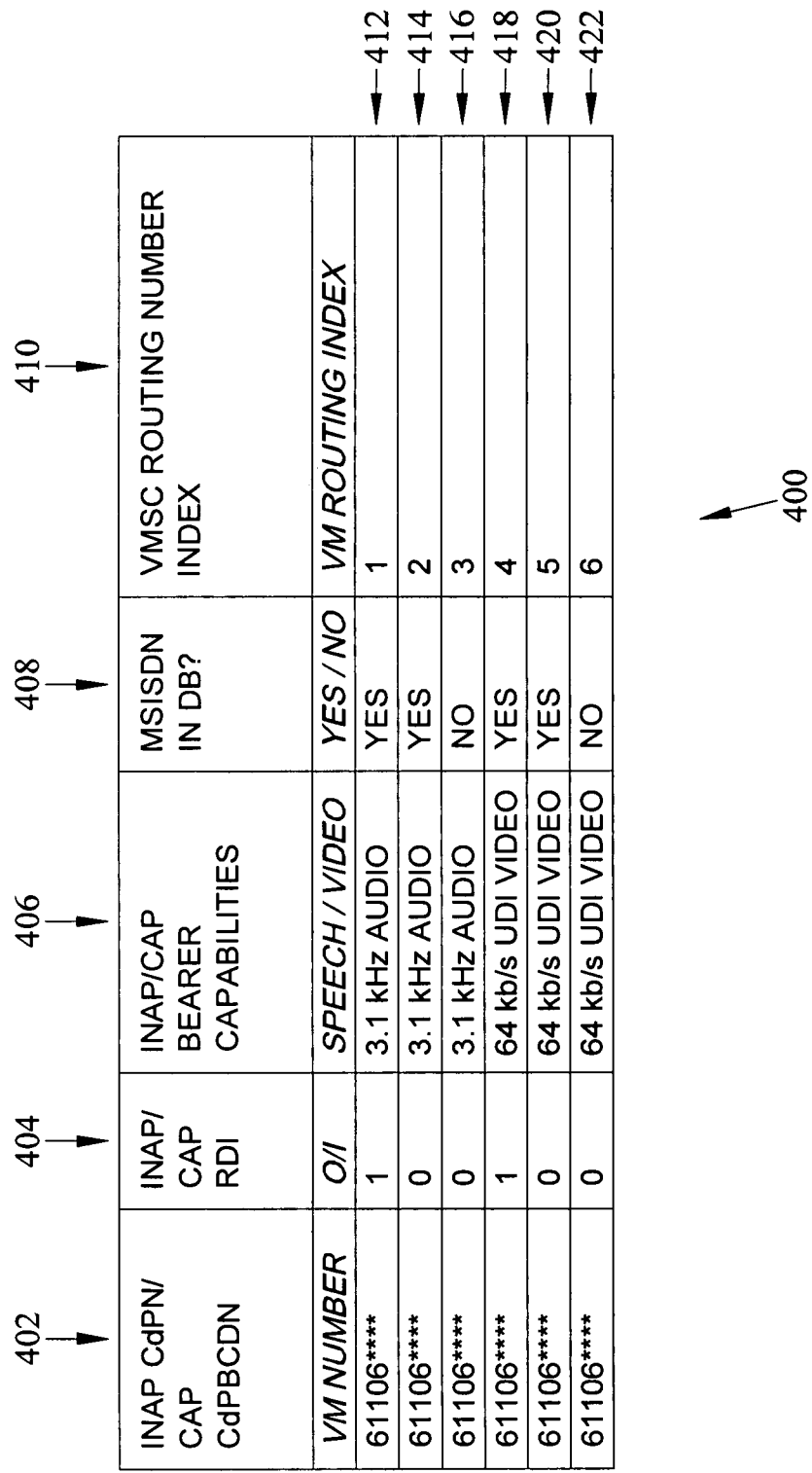
FIG. 4 is an exemplary table for associating call decision criteria with a voicemail service index according to an embodiment of the subject matter described herein.

FIG. 4 is an exemplary table for associating various call parameters with VMSC Indexes for providing voicemail routing information in a network that provides customized voicemail services according to an embodiment of the subject matter described herein. Referring to FIG. 4, Table 400 includes a plurality of columns that include various call decision criteria associated with one or more VM Indexes.

In the example call decision table 400 illustrated in FIG. 4, a different VM Index is associated with each type of voicemail service provided by at least one of the available VMSCs. For example, in FIG. 4, VM Index=1 indicates a standard voicemail deposit, VM Index=2 indicates an authorized VM retrieval, and VM Index=3 indicates an unauthorized VM retrieval. Because subscribers typically deposit voicemail messages intended for subscribers other than themselves, an indicator of an intended VM deposit transaction may include an indicator that the calling party was redirected to the called subscriber's voicemail. Conversely, an indication that the calling party was not redirected may indicate a retrieval transaction. In Table 400, retrieval transactions are divided into authorized and unauthorized transactions based on a whether an MSISDN was found in Table 300. However, it is appreciated that deposit transactions may also be divided into authorized and unauthorized categories, or retrieval transactions may be combined into a single category without departing from the scope of the subject matter described herein.

Similar to VM Indexes 1-3 described above, VM Indexes 4-6 correspond to similar transactions, except for being related to video-voicemail transactions rather than standard voice-voicemail transactions. For example, VM Index=4 indicates a video-voicemail deposit. VM Index=5 indicates an authorized video-voicemail retrieval and VM Index=6 indicates an unauthorized video-voicemail retrieval. VM Indexes=7 and above may be reserved for default or error voicemail transactions.

In FIG. 4, column 402 includes INAP CdPN/CAP CdPB-CDN values, and in the illustrated example, each entry is identically populated with CdPN 61106****. Therefore, as each of the MSISDNs used in the example scenario above begin with 61106, they are included in column 402. However, it is appreciated that additional CdPNs may be included in Table 400 without departing from the subject matter described herein. Column 404 may include INAP/CAP RDI values indicating whether the calling party has been redirected. In the embodiment illustrated in column 404, an RDI=1 indicates that the calling party has been redirected. For example, a calling party dials a called party but receives no answer. The calling party may then be automatically redirected to the called party's voicemail service so that he or she may leave a voicemail deposit. Alternatively, an RDI=0 indicates that the calling party has not been redirected, which may include scenarios in which a subscriber dials his own voicemail number. In this case, the calling party number and the called party number are associated with the same subscriber, and are typically associated with a voicemail retrieval transaction.

Column 406 includes INAP/CAP bearer capabilities values indicating, for example, whether the calling party is placing a voice- or video-based voicemail call. Column 408 may include a value indicating whether an entry matching the MSISDN extracted from query 112 was located in Table 300. For example, a text string such as "yes" or "no" may be included in column 408, or a numerical method similar to column 404. Column 410 includes VM Indexes corresponding to VM services located on each VMSC 106-110. In exemplary Table 400, VM Indexes 1-6 are illustrated, corresponding to deposit and retrieval services for both standard voicemail and premium video-voicemail transactions.

In the standard voicemail deposit scenario described earlier, a VMSC ID=1 was obtained for the MSISDN 611061. Using this same MSISDN, a VMSC Index=1 may be obtained in entry 412 based on a match between information contained in query 112 and call decision criteria located in columns 402-410. For example, a VMSC Index=1 may be obtained in Table 400 based on a lookup performed based on CdPN=611061*, RDI=1, 3.1 kHz audio bearer capabilities, and locating the MSISDN in Table 300. Based on these parameters, a calling party wishing to make a voicemail deposit may be routed to a voicemail deposit service on an appropriate VMSC.

Continuing the authenticated standard voicemail retrieval scenario described above, a VMSC ID=2 was obtained for the MSISDN 611062. Using this MSISDN, a VMSC Index=2 may be obtained in entry 414 based on a match between information contained in query 112 and call decision criteria located in columns 402-410. For example, a VMSC Index=2 may be obtained in Table 400 based on a voicemail routing query 112 that contains CdPN=611062*, RDI=0, 3.1 kHz audio bearer capabilities, and successfully locating the MSISDN in Table 300.

Continuing the unauthenticated standard voicemail retrieval scenario described above, a VMSC ID=3 was obtained for the MSISDN 611062. Using this MSISDN, a VMSC Index=3 may be obtained in entry 416 based on a match between information contained in query 112 and call decision criteria located in columns 402-410. For example, a VMSC Index=3 may be obtained in Table 400 based on a voicemail routing query 112 that contains CdPN=611062*, RDI=0, 3.1 kHz audio bearer capabilities, and not locating the MSISDN in Table 300.

Continuing the premium voicemail deposit scenario described above, a VMSC ID=4 was obtained for the MSISDN 611063. Using this MSISDN, a VMSC Index=4 may be obtained in entry 418 based on a match between information contained in query 112 and call decision criteria located in columns 402-410. For example, a VMSC Index=4 may be obtained in Table 400 based on a voicemail routing query 112 that contains CdPN=611063*, RDI=1, 64 kb/s UDI video bearer capabilities, and successfully locating the MSISDN in Table 300.

FIG. 5 is an exemplary table for associating one or more mobile station integrated services digital networks or mobile station ISDN numbers (MSISDNs) to one or more voice mail server IDs in order to provide voicemail routing information in a network providing customized voicemail services according to an embodiment of the subject matter described herein. Referring to FIG. 5, a voicemail routing number (VM RN) may be obtained based on a lookup performed using a VMSC ID and VMSC Index value, where the obtained VM RN uniquely identifies a VMSC and VM service for performing a voicemail transaction. The obtained VM RN may be included in VM routing response 122.

It is appreciated in FIG. 5 that column 502 may include any suitable number of VMSC IDs, including a default VMSC ID for scenarios in which a lookup in Table 300 fails to locate a specific VMSC ID associated with a subscriber. Moreover, it is appreciated that column 504 may include any suitable number of VMSC Indexes, which may or may not be fully utilized by all VMSCs. In the embodiment illustrated in FIG. 5, column 504 includes ten VMSC Indexes for each VMSC ID, but reserves VM Indexes 7-10 for voicemail services not shown in FIG. 1. Column 506 may include a VM routing number identifying a particular VMSC and VM service pair. In column 506, VM routing numbers associated with standard voicemail transactions begin with digits 612 and VM routing numbers associated with standard voicemail transactions begin with digits 614.

Continuing the standard voicemail deposit scenario described above, a VMSC ID=1 resulting from the determination made in Table 300 and a VM Index=1 resulting from the determination made in Table 400 are associated with entry 508 containing VM RN=612000589 in Table 500. This VM RN corresponds to a standard voicemail deposit service located on standard voicemail server 106.

Continuing the authenticated voicemail retrieval scenario described above, a VMSC ID=2 resulting from the determination made in Table 300 and a VM Index=2 resulting from a determination made in Table 400 are associated with entry 510 containing VM RN=612000713 in Table 500. This VM RN corresponds to an authenticated voicemail retrieval service located on standard voicemail server 106.

Continuing the unauthenticated voicemail retrieval scenario described above, a VMSC ID=2 resulting from the determination made in Table 300 and a VM Index=3 resulting from a determination made in Table 400 are associated with entry 512 containing VM RN=612000900 in Table 500. This VM RN corresponds to an unauthenticated voicemail retrieval service located on standard voicemail server 106.

Continuing the video-voicemail deposit scenario described above, a VMSC ID=3 resulting from the determination made in Table 300 and a VM Index=4 resulting from the determination made in Table 400 are associated with entry 514 containing VM RN=614000557. This VM RN corresponds to a standard vide-voicemail deposit service located on premium voicemail server 110.

Figure 6:
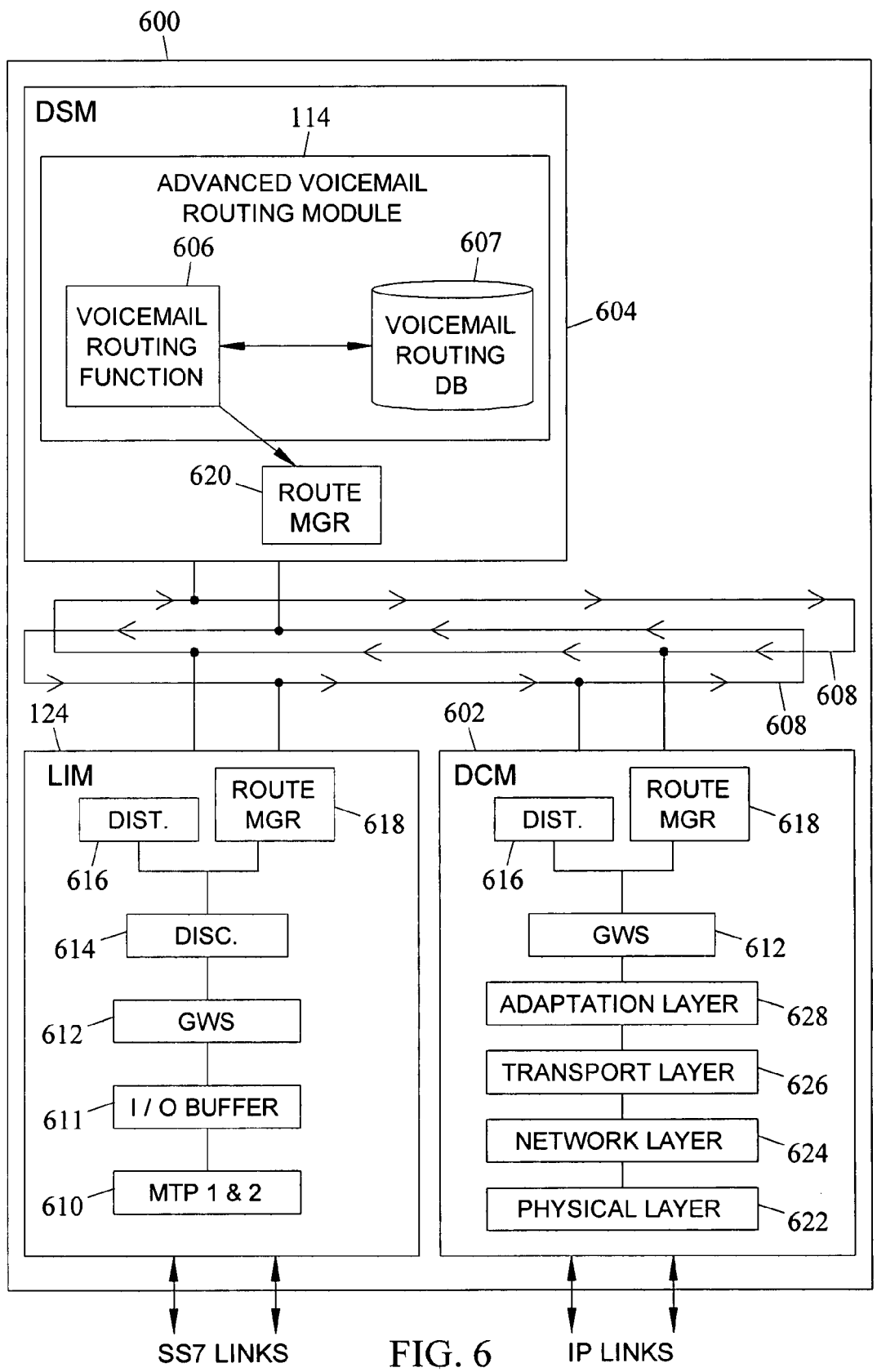
FIG. 6 is a block diagram of an exemplary advanced voicemail routing node for providing advanced voicemail routing information in a network that provides customized voicemail services according to an embodiment of the subject matter described herein.

FIG. 6 is a block diagram of an exemplary internal architecture of a network node for providing per-subscriber voice mail server routing according to an embodiment of the subject matter described herein. Referring to FIG. 6, advanced voicemail routing node 106 may be located at a signaling message routing node, such as a signal transfer point (STP), that includes an internal communications bus 608 that includes two counter-rotating serial rings. A number of processing modules or cards may be coupled to bus 608. In FIG. 6, bus 608 may be coupled to a communications module, such as a link interface module (LIM) 124, a data communications module (DCM) 602, and a database service module (DSM) 604. These modules are physically connected to bus 608 such that signaling and other types of messages may be routed internally between active cards or modules. For simplicity of illustration, only a single LIM, a single DCM, and a single DSM cards are included in FIG. 6. However, signaling message routing node 106 may include multiple other LIMs, DCMs, DSMs, and other cards, all of which may be simultaneously connected to and communicating via bus 608.

Each module 124, 602, and 604 may execute the applications or functions that reside on each module and control communication with other modules via bus 608. For example, DSM 604 may execute software that determines voicemail routing information in a network that provides customized voicemail services.

LIM 124 may include an SS7 MTP level 1 and 2 function 610, an I/O buffer 611, a gateway screening (GWS) function 612, a message discrimination function 614, a message distribution function 616, and a route manager 618. MTP level 1 and 2 function 610 sends and receives digital data over a particular physical interface, provides error detection, error correction, and sequenced delivery of SS7 message packets. I/O buffer 611 provides temporary buffering of incoming and outgoing signaling messages.

GWS function 612 examines received message packets and determines whether the message packets should be allowed into signaling message routing node 114 for processing and/or routing. Discrimination function 614 performs discrimination operations, which may include determining whether the received message packet requires processing by an internal processing subsystem or is simply to be through switched (i.e., routed on to another node in the network). Messages that are permitted to enter signaling message routing node 114, such as voicemail routing queries, may be routed to other communications modules in the system or distributed to an application engine or processing module via bus 608.

DSM 604 may receive voicemail routing queries from LIM 124 via message distribution function 616. Distribution function 616 located on LIM 124 may forward initial detection point (IDP) queries to DSM 604 via bus 608. Upon receiving an IDP query, voicemail routing function 606 may perform a lookup in voicemail routing database 607 to determine a voicemail routing number based on information contained in the IDP query. Voicemail routing database 607 may contain voicemail routing information, such as MSISDNs, VMSC IDs, VM indexes, bearer capabilities, and other information as illustrated in FIGS. 3-5. Upon determining a voicemail routing number based on an IDP query, voicemail routing function 606 may generate an IDP response including the determined voicemail routing number, and forward the response message to DCM 602 via bus 608 and route manager 620.

DCM 602 includes functionality for sending and receiving SS7 messages over IP signaling links. In the illustrated example, DCM 602 includes a physical layer function 622, a network layer function 624, a transport layer function 626, an adaptation layer function 628, and functions 612, 616, and 618 described above with regard to LIM 601. Physical layer function 622 performs open systems interconnect (OSI) physical layer operations, such as transmitting messages over an underlying electrical or optical interface. In one example, physical layer function 622 may be implemented using Ethernet. Network layer function 624 performs operations, such as routing messages to other network nodes. In one implementation, network layer function 624 may implement Internet protocol. The transport layer function 626 implements OSI transport layer operations, such as providing connection oriented transport between network nodes, providing connectionless transport between network nodes, or providing stream oriented transport between network nodes. Transport layer function 626 may be implemented using any suitable transport layer protocol, such as stream control transmission protocol (SCTP), transmission control protocol (TCP), or user datagram protocol (UDP). Adaptation layer function 628 performs operations for sending and receiving SS7 messages over IP transport. Adaptation layer function 628 may be implemented using any suitable IETF or other adaptation layer protocol. Examples of suitable protocols include MTP level 2 peer-to-peer user adaptation layer (M2PA), MTP level 3 user adaptation layer (M3UA), and/or signaling connection control part (SCCP) user adaptation layer (SUA). Functions 612, 616, and 618 perform the same operations as the corresponding components described above with regard to LIM 601.

Voicemail routing database 604 may be provisioned by a centralized database, such as the EAGLE™ provisioning and application server available from Tekelec, Inc. of Morrisville, N.C. EPAP and advanced voicemail routing node 114 may each include a provisioning database interface (PDBI) for providing provisioning services, where the PDBI is a socketbased interface connecting nodes via transmission control protocol/Internet protocol (TCP/IP). The PDBI supports creating or deleting an MSISDN and/or a VMSC ID in Table 300, as well as retrieving attributes of an MSISDN with a specific status when an MSISDN does not exist or cannot be located in Table 300.

Figure 7:
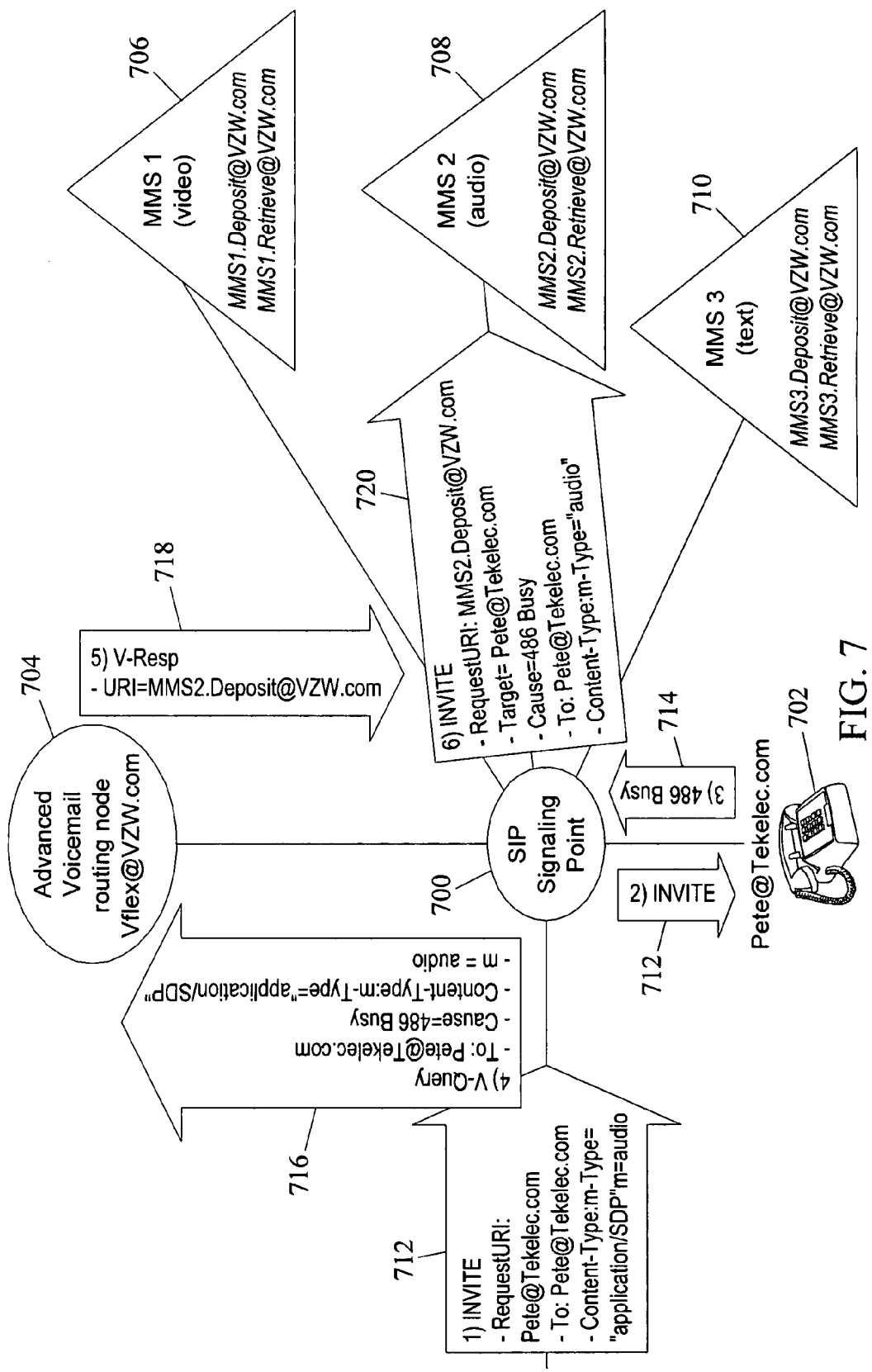
FIG. 7 is a network diagram illustrating a query and response-based indirect voicemail deposit scenario in an exemplary system for providing voicemail routing information in a network that provides customized voicemail services according to an embodiment of the subject matter described herein.

In the examples described above, advanced voicemail routing information is obtained for SS7 signaling messages. However, the presently disclosed subject matter is not limited to these examples. In an alternate example, advanced voicemail routing information can be obtained for SIP signaling messages. FIG. 7 is a network diagram illustrating a query and response-based indirect voicemail deposit scenario in an exemplary system for providing voicemail routing information for SIP messages in a network that provides customized voicemail services according to an embodiment of the subject matter described herein. Referring to FIG. 7, an exemplary network for providing advanced voicemail services may include SIP signaling point 700, client device 702, and advanced voicemail routing node 704. In this example, client device 702 may be identified by the SIP uniform resource indicator (URI) Pete@Tekelec.com and may be connected to SIP signaling point 700. SIP signaling point 700 may also be connected to advanced voicemail routing node 704 and multimedia voicemail message servers (MMS) 706, 708, and 710 for providing advanced voicemail services. In this embodiment, MMS 706 may process video voicemail messages and may be associated with one or more URIs including MMS1.Deposit@VZW.com and MMS1.Retreival@VZW.com for performing video voicemail deposit and retrieval transactions, respectively. MMS 708 may process audio voicemail messages and may be associated with URIs MMS2.Deposit@VZW.com and MMS2.Retreival@VZW.com for performing audio voicemail deposit and retrieval transactions, respectively. MMS 710 process text voicemail messages and may be associated with URIs MMS3.Deposit@VZW.com and MMS3.Retreival@VZW.com for performing text voicemail deposit and retrieval transactions, respectively.

In the scenario illustrated in FIG. 7, SIP messages addressed to called party 702 may be received by SIP signaling point 700. For example, SIP Invite message 712 may be received by SIP signaling point 700 where message 712 includes Pete@Tekelec.com in the To and RequestURI parameters indicating that client device 702 is the intended called party for the session. Message 712 may also include a Content-Type: m-type="application/SDP" and a media type "audio" indicating that message 712 relates to an audio transaction. It is appreciated that in addition to the message parameters included in the header of Invite message 712 described above, information related to providing advanced voicemail service in a SIP network may be included without departing from the scope of the subject matter described herein. Furthermore, it is appreciated that media type information may be extracted from sources other than those listed above, including session description protocol (SDP) parameters, multipurpose Internet mail extensions (MIME) parameters, and other parameters included in the payload portion of SIP message 712. In addition to Invite message 712 described above, additional SIP messages may also be received by SIP signaling point 700 without departing from the scope of the subject matter described herein.

Upon receiving Invite message 712, SIP signaling point 700 may route message 712 to called party 702. In this exemplary scenario, called party 702 is unavailable to receive the call and therefore, in response, may generate 486 busy message 714. It is appreciated that additional URI parameters may be generated by called party 702 including, but not limited to, unknown/not available 404, no reply 408, unconditional 302, deflection during alerting 487, deflection immediate response 480, mobile subscriber not reachable 503.

SIP signaling node may then generate and send voicemail query 716 to advanced voicemail routing node 704 which includes Cause parameter 486 Busy extracted from message 714. In addition, voicemail query 716 may include information included in Invite message 712, such as the called party URI and the media type. In response to advanced voicemail routing query 716, advanced voicemail routing node 704 may generate voicemail response message 718 and send it to one of voicemail servers 706-710 based on an examination of information included in query 716.

In the example illustrated in FIG. 7, because the media type included in query 716 indicates an audio call to unavailable subscriber 702, advanced voicemail routing node 704 may determine that an audio voicemail deposit is desired and send message 718 to MMS2.Deposit@VZW.com associated with audio voicemail server 708 where an audio voicemail deposit transaction may be performed.

Accordingly, it is appreciated that multiple levels of voicemail discrimination are possible by advanced voicemail routing node 704 depending on the type of information included in, for example, voicemail query message 716. A first level of discrimination for determining a particular voicemail server to be associated with a given voicemail transaction includes the called party identifier. A second level of discrimination may include determining a voicemail server based on media type information included in, for example, a SIP Invite message associated with the transaction. Thirdly, the Cause code generated by the called party may be used to determine the type of voicemail transaction to be performed. For example, in one possible embodiment, voicemail servers 706-710 may be divided by transaction type in addition to media type and called party identifier. Therefore, advanced voicemail routing node may examine SIP information associated with the voicemail transaction in order to route the message to the proper voicemail server.

Figure 8:
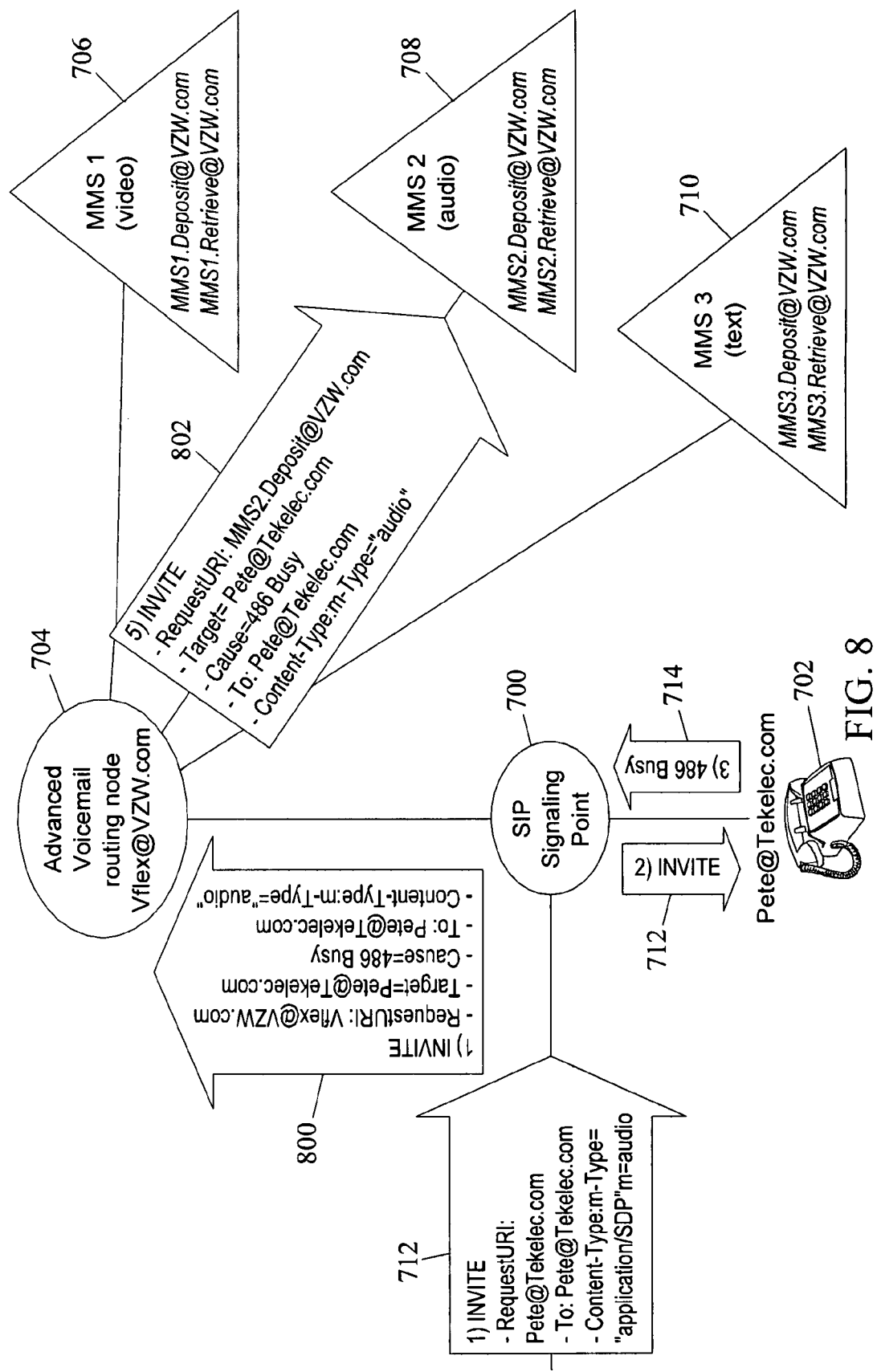
FIG. 8 is a network diagram illustrating a relay-based indirect voicemail deposit scenario in an exemplary system for providing voicemail routing information in a network that provides customized voicemail services according to an embodiment of the subject matter described herein.

In the example in FIG. 7, advanced voicemail routing information for SIP messages is obtained using a query and response-based method. In an alternate example, advanced voicemail routing information for SIP messages may be obtained using a message relay-based method. FIG. 8 is a network diagram illustrating a relay-based indirect voicemail deposit scenario in an exemplary system for providing voicemail routing information in a network that provides customized voicemail services according to an embodiment of the subject matter described herein. Referring to FIG. 8, SIP Invite message 712 may be received by SIP signaling node 700. Similar to the scenario described above with respect to FIG. 7, called party 702 may be unavailable and therefore message 714 including cause parameter busy 486 may be generated. However, rather than the query and response embodiment of FIG. 7, FIG. 8 provides for modifying the SIP Invite message to include a Cause code generated by called party 702 and relaying the Invite message through an advanced voicemail routing node 704 to one of voicemail servers 706-710. For example, Invite message 800 including request URI=Vflex@VZW.com, target=Pete@Tekelec.com, and Cause code 486 may be received by advanced voicemail routing node 704. RequestURI=Vflex@VZW.com indicates that message 800 is directed to node 704, target=Pete@Tekelec.com indicates the message was routed from called party 702, and cause code 486 indicates that a voicemail deposit is desired. Advanced voicemail routing node 704 may then transmit message 802 directly to audio voicemail server 708, where message 802 includes Request URI=MMS2.Deposit@VZW.com associated with node 708.

Figure 9:
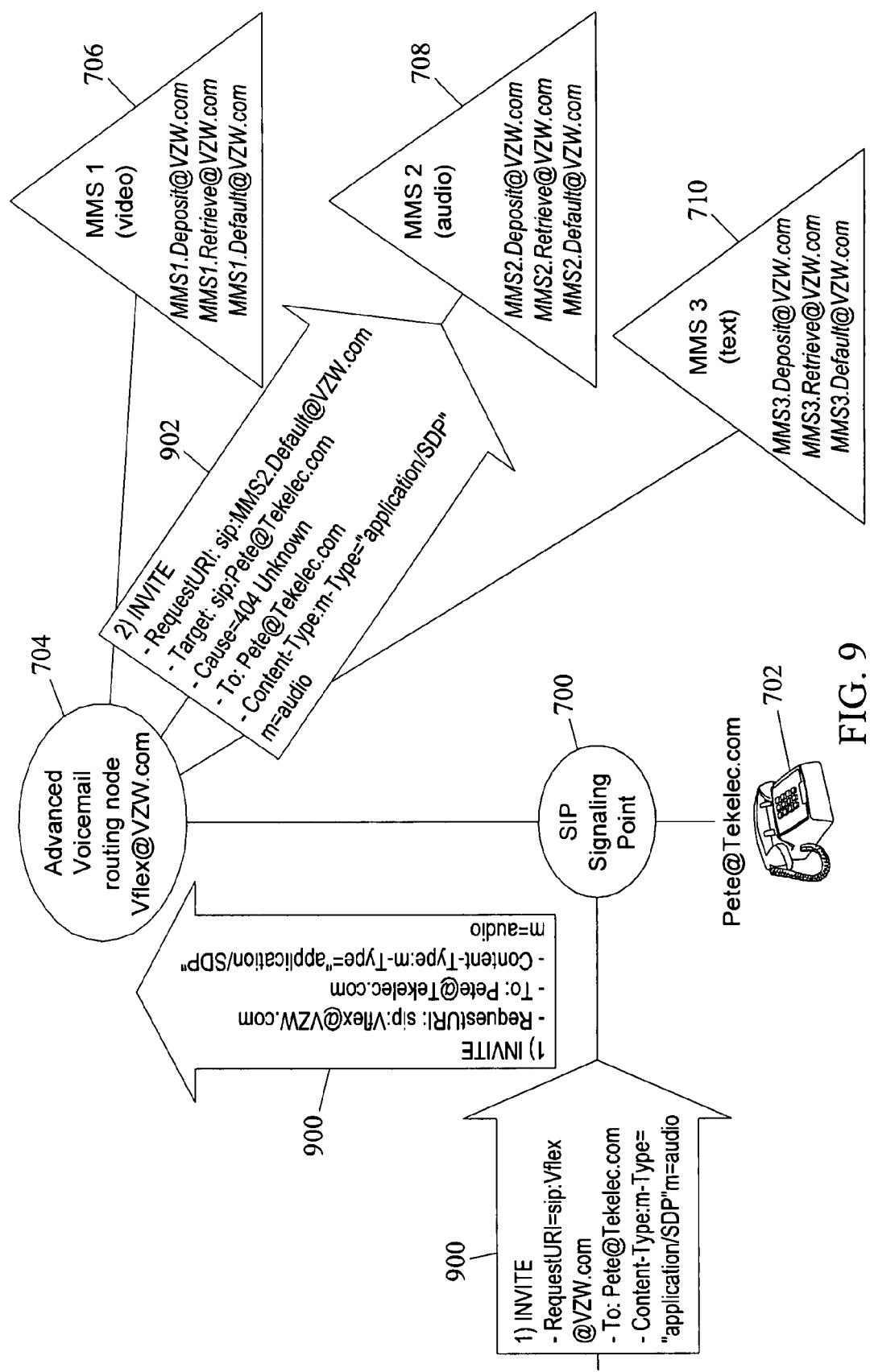
FIG. 9 is a network diagram illustrating a direct voicemail deposit or retrieval scenario in an exemplary system for providing voicemail routing information in a network that provides customized voicemail services according to an embodiment of the subject matter described herein.

FIG. 9 is a network diagram illustrating a direct voicemail deposit/retrieval scenario using SIP in an exemplary system for providing voicemail routing information in a network that provides customized voicemail services according to an embodiment of the subject matter described herein. Referring to FIG. 9, SIP Invite message 900 may be received by SIP signaling node 700 and routed to advanced voicemail routing node 704 where a determination is made by node 704 based on information contained in message 900 regarding which voicemail server is associated with the desired voicemail transaction. However, Invite message 900 does not contain enough information for advanced voicemail routing node to determine whether a voicemail deposit or voicemail retrieval transaction is desired. Therefore, advanced voicemail routing node 704 may generate Invite message 902 including Request URI=MMS2.Default@VZW.com and send message 902 to MMS2 708 because MMS2 708 is associated with the URI MMS2.Default@VZW.com. It is appreciated that voicemail servers 706 and 710 may also be associated with multiple URIs, including URIs corresponding to default voicemail transactions. However, in the example illustrated in FIG. 9, message 900 includes a media type parameter indicating an audio call and therefore advanced voicemail routing node 704 determines to route the call to audio voicemail server 708.

Figure 10:
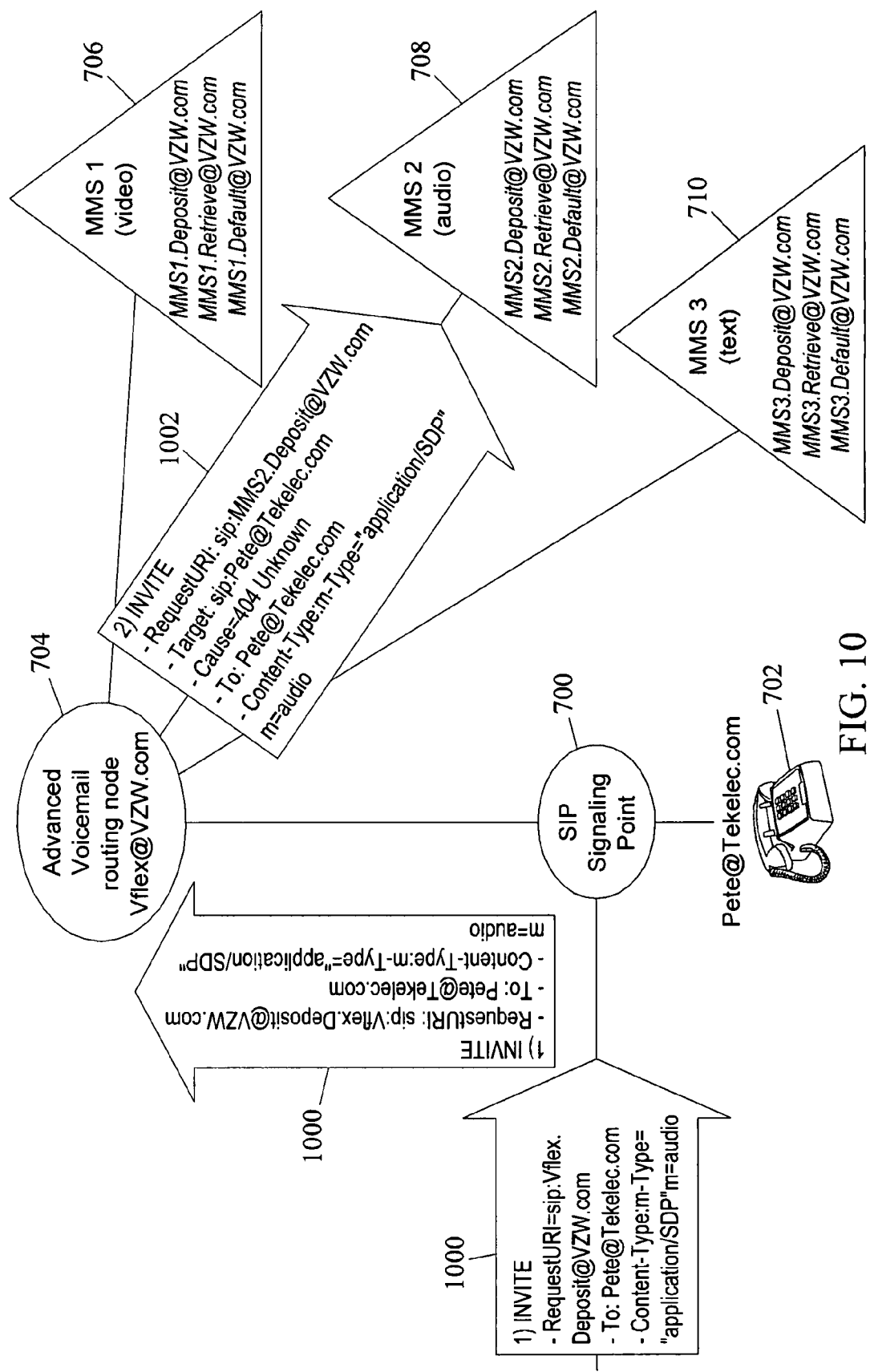
FIG. 10 is a network diagram illustrating a direct voicemail deposit scenario in an exemplary system for providing voicemail routing information in a network that provides customized voicemail services according to an embodiment of the subject matter described herein.

FIG. 10 is a network diagram illustrating a direct voicemail deposit scenario in an exemplary system for providing voicemail routing information in a network that provides customized voicemail services according to an embodiment of the subject matter described herein. Similar to the scenario described above with respect to FIG. 9, a SIP Invite message may be received by SIP signaling node 700. However, in contrast to Invite message 900 which includes no parameters indicating whether a voicemail deposit or retrieval is desired, Invite message 1000 may include information expressly indicating that a voicemail deposit transaction is desired. For example, in contrast to RequestURI=Vflex@VZW.com contained in message 900, Invite message 1000 may include RequestURI=Vflex.Deposit@VZW.com. Therefore, upon receiving message 1000, advanced voicemail routing node 704 may use the more detailed RequestURI to route the message to the appropriate voicemail server for performing a voicemail deposit transaction. For example, MMS 708 may be identified by more than one URI, including for example, MMS2.Deposit@VZW.com, MMS@.Retrieval@VZW.com, and MMS2.Default@VZW.com for performing deposit, retrieval, and default voicemail transactions, respectively. It is appreciated that advanced voicemail routing node 704 may modify and/or otherwise use message 1000 in order to generate SIP Invite message 1002. For example, in the exemplary scenario illustrated in FIG. 10, the RequestURI parameter included in message 1002 may include the URI associated with a destination voicemail server and a Cause parameter, such as 404 unknown in this example. It is further appreciated that in addition to the exemplary SIP message parameters and methods described above, other message parameters may be used to discriminate between voicemail messages associated with different types of voicemail transactions, and therefore between different voicemail servers.

Figure 11:
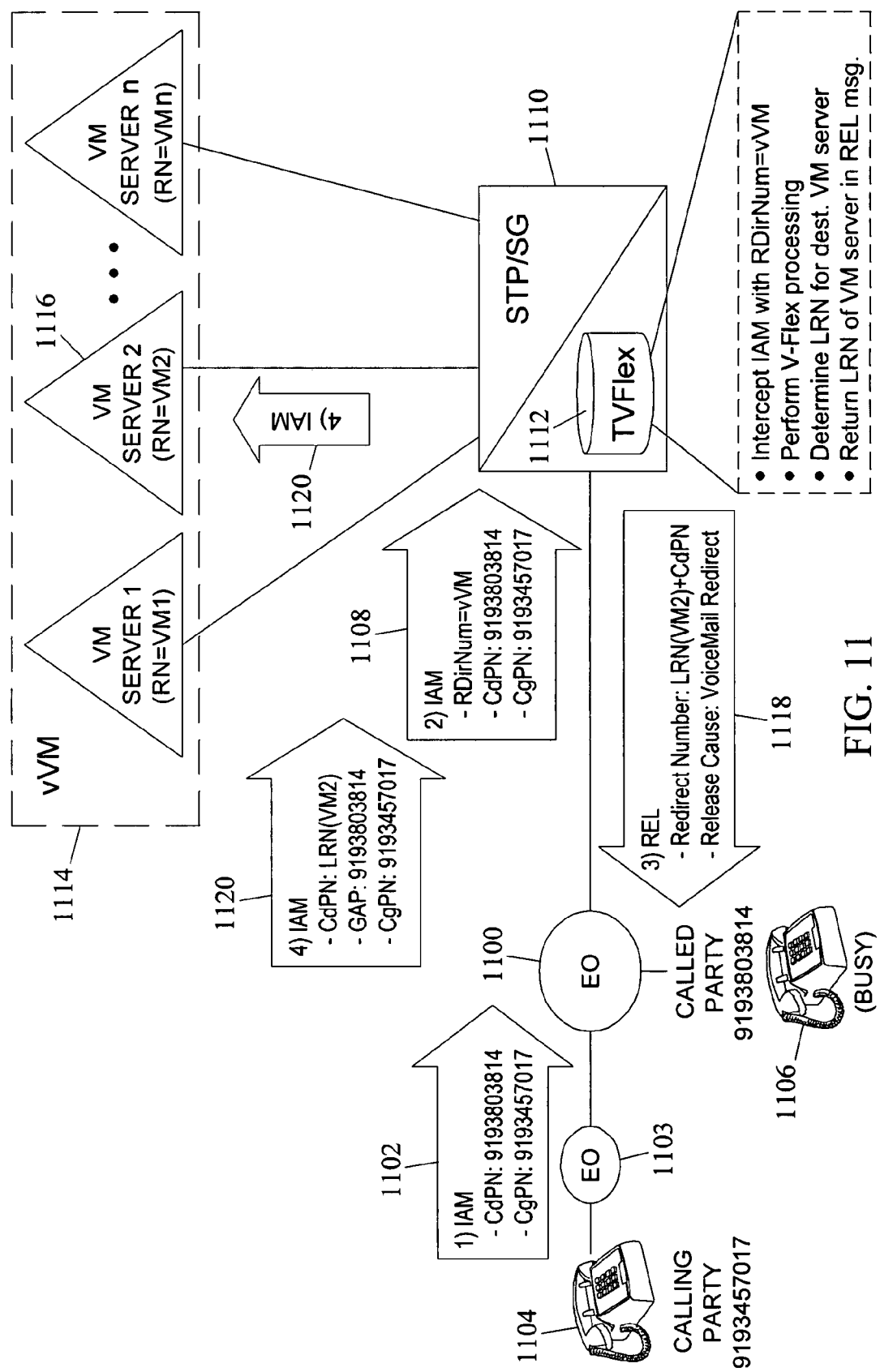
FIG. 11 is a network diagram illustrating a triggerless voicemail deposit scenario in an exemplary system for providing voicemail routing information in a network that provides customized voicemail services according to an embodiment of the subject matter described herein.

FIG. 11 is a network diagram illustrating a triggerless voicemail deposit scenario in an exemplary system for providing voicemail routing information in a network that provides customized voicemail services according to an embodiment of the subject matter described herein. In circuit switched network environments, such as PSTN and GSM/IS-41 wireless network environments, triggerless embodiments of the advanced voicemail routing functionality described herein may be implemented without requiring or involving a TCAP query/response mechanism. Such triggerless embodiments may be advantageous because they do not require a network operator to provision new IN/AIN TCAP query triggers in order to obtain advanced voicemail routing VM routing information.

The exemplary embodiment shown in FIG. 11 illustrates a fixed/PSTN implementation of triggerless advanced voicemail routing functionality. In this example, end office 1100 may receive ISUP IAM message 1102 from a calling party end office 1105 in response to a call attempt from calling party 1104. The calling party number in this example is 9193457017 and the call is directed to called party 1106 having called party number 9193803814. In this example, after receiving IAM 1102, EO 1100 may determine that called party 1106 is busy. EO 1100 determines that called party 1106 is subscribed to/authorized to use a network-based voice mail service. Accordingly, EO 1100 determines a Redirect Number associated with the VM service. In one embodiment, the Redirect Number may be a POTS number that is associated with the VM service, or the Redirect Number may be a POTS number that is associated with an advanced voicemail routing function 1114. EO 1110 may then generate IAM message 1108 that includes the VM Redirect Number. IAM message 1108 may then be transmitted to STP 1110, where STP 1110 may include an integrated advanced voicemail routing function or a non-integrated advanced voicemail routing function may be accessible by STP 1110. In the example shown, STP 1110 includes an integrated advanced voicemail routing function 1112. Continuing the example, STP 1110 may receive IAM message 1108 and examine the Redirect Number information contained in the message. STP 1110 may identify the Redirect Number as being associated with STP/advanced voicemail routing function 1110 and pass IAM message 1108 to advanced voicemail routing function 1112. Advanced voicemail routing function 1112 may then examine information contained in IAM message 1108 and, based on this information, select one of VM servers 1114 to which the call should directed. Exemplary IAM information that may be used to select a VM server includes, but is not limited to, called party number information.

In the illustrated embodiment, advanced voicemail routing function 1112 may return a location routing number (LRN) associated with the selected VM server and terminate IAM message 1108. Advanced voicemail routing function 1112 may then generate an ISUP response message, such as REL message 1118, that is returned to EO 1100, where the ISUP response message includes information which identifies the selected VM server. Exemplary ISUP response messages may include, but are not limited to an ISUP RELEASE (REL) message and an ISUP Address Complete (ACM) message. In the exemplary embodiment shown in FIG. 11, advanced voicemail routing function 1112 terminates IAM message 1108 and generates a REL message 1118. In one embodiment, REL message 1118 may include a Redirection Number parameter, where the VM Redirect Number+original CdPN value are stored. In an alternate embodiment, the VM Redirect Number value may be stored in the Redirection Number parameter, while the original CdPN value is stored in a Generic Address Parameter. In the example illustrated in FIG. 11, an optional release cause code value (e.g., voice mail redirect) is also included in REL message 1118.

Upon receiving the REL message 1118, EO 1100 may generate a subsequent ISUP IAM message, such as ISUP IAM message 1120, which includes the LRN of the selected VM server, as well as the original CdPN and CgPN information. It is appreciated that EO 1100 may also generate an ISUP Release Complete message (not shown) without departing from the scope of the subject matter described herein. IAM message 1120 may then be routed via STP 1110 to VM server 1116 identified by the included VM LRN.

As such, using the triggerless advanced voicemail routing functionality described herein, an EO (or MSC, MGC, SS, etc.) may take advantage of advanced voicemail routing functionality without requiring AIN/IN triggers or TCAP query/response transactions.

Figure 12:
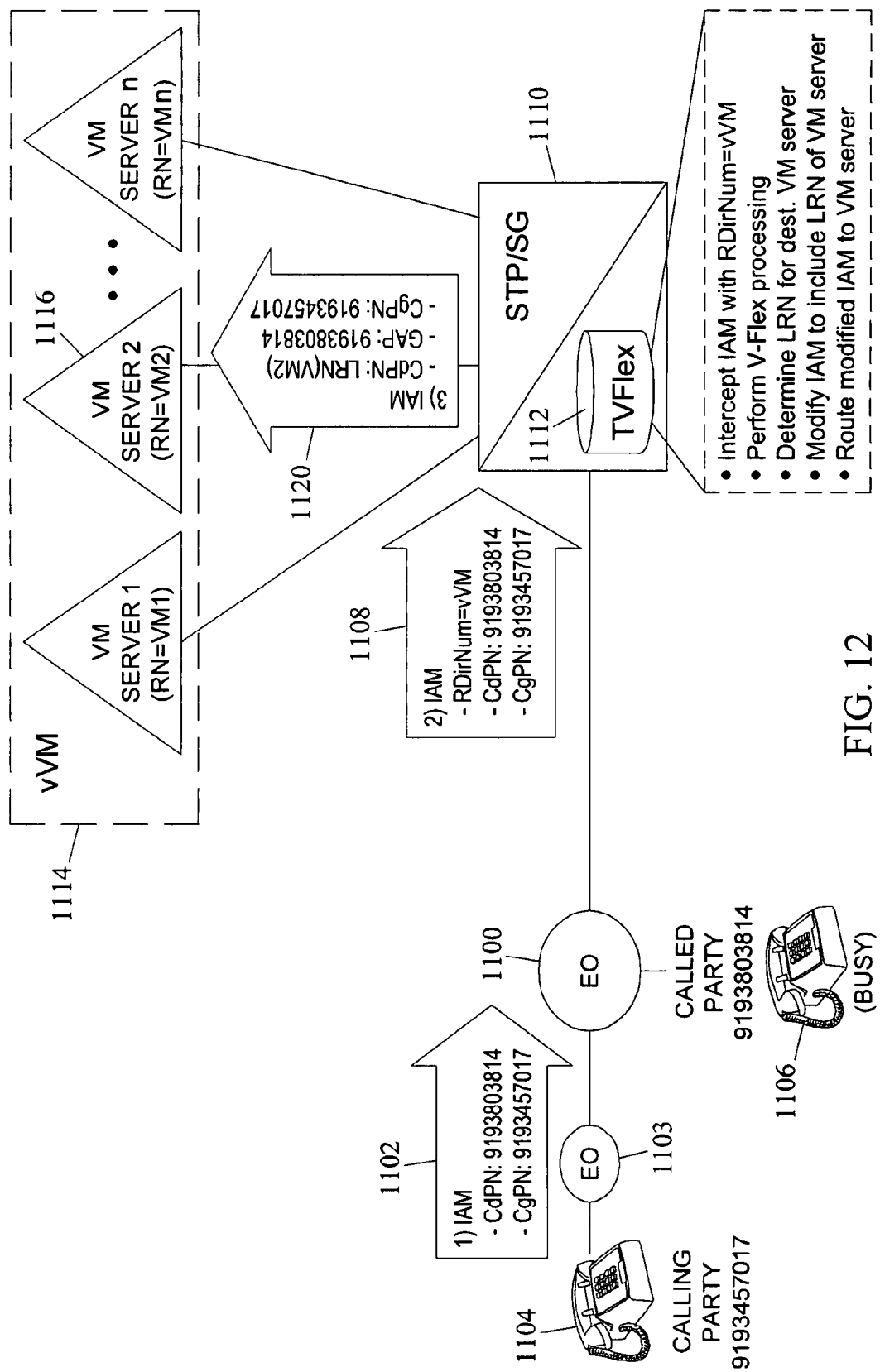
FIG. 12 is a network diagram illustrating a triggerless voicemail deposit scenario in an exemplary system for providing voicemail routing information in a network that provides customized voicemail services according to an embodiment of the subject matter described herein.

FIG. 12 is a network diagram illustrating a triggerless voicemail deposit scenario in an exemplary system for providing voicemail routing information in a network that provides customized voicemail services according to an embodiment of the subject matter described herein. The exemplary embodiment shown above is for a fixed/PSTN implementation of triggerless advanced voicemail routing. In this example, end office 1100 receives ISUP IAM message 1102 generated by end office 1103 in response to a call attempt from calling party 1104 associated with calling party number 9193457017. The call may be directed to called party 1106 associated with called party number 9193803814. EO 1100 receives IAM 1102 and determines that called party 1106 is busy. EO 1100 determines that called party 1106 is subscribed to/authorized to use a network-based voice mail service. Accordingly, EO 1100 determines a Redirect Number associated with the VM service. In one embodiment, the Redirect Number may be a POTS number that is associated with the VM service, or the Redirect Number may be a POTS number that is associated with an advanced voicemail routing function.

Continuing the illustrated example, EO 1100 may generate IAM message 1108 and include the VM Redirect Number. IAM message 1108 may then be transmitted to STP 1110, where STP 1110 may include an integrated advanced voicemail routing function or a non-integrated advanced voicemail routing function may be accessible by STP 1110. In the example shown, STP 1110 includes an integrated advanced voicemail routing function 1112. STP 1110 receives IAM message 1108 and examines the Redirect Number information contained in the message. STP 1110 identifies the Redirect Number as being associated with STP/advanced voicemail routing function 1110, and passes IAM message 1108 to advanced voicemail routing function 1112. Advanced voicemail routing function 1112 examines information contained in IAM message 1108 and, based on this information, may select one of many VM servers 1114 to which the call should directed. Exemplary IAM information that may be used to select a VM server includes, but is not limited to, called party number information. Advanced voicemail routing function 1112 may return a local routing number associated with the selected VM server, such as VM server 1116 in the example illustrated in FIG. 12.

As opposed to the triggerless embodiment described in FIG. 11, the advanced voicemail routing function shown in FIG. 12 is adapted to modify, rather than terminate, the IAM message to include information (e.g., the LRN of the selected VM server) identifying the selected VM server. The modified IAM message 1120 is then routed via STP 1110 to the VM server identified by the VM LRN (i.e. VM server 1116).

As such, using such triggerless V-flex functionality, an EO (or MSC, MGC, SS, etc.) may take advantage of V-flex functionality without requiring AIN/IN triggers or TCAP query/response transactions.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing voicemail routing information, the method comprising:

receiving a voicemail routing query message including at least one query message parameter associated with a voicemail transaction, wherein the voicemail routing query message is associated with a subscriber of one or more advanced voicemail services;

determining voicemail routing information based on the at least one query message parameter, wherein the voicemail routing information identifies a voicemail server configured to perform and provide the one or more advanced voicemail services, wherein the voicemail routing information includes a voicemail routing number that identifies a voicemail server and a voicemail service, and wherein determining the voicemail routing information based on the at least one query message parameter includes identifying the voicemail server among a plurality of voicemail servers where at least some of the voicemail servers provide different services, wherein the at least one query parameter includes a subscriber identifier and a call condition, wherein the call condition indicates whether a voicemail call is associated with a voicemail deposit or a voicemail retrieval transaction and wherein each of the plurality of voicemail servers has unique routing information; and generating a voicemail routing response message including the determined voicemail routing information.

2. The method of claim 1 wherein receiving a voicemail routing query message includes receiving a voicemail routing query message generated by a mobile switching center (MSC).

3. The method of claim 1 wherein determining voicemail routing information based on the at least one query message parameter includes determining the voicemail routing number using another query message parameter selected from the group consisting of a message transfer part (MTP) originating point code (OPC), MTP destination point code (DPC), SCCP called party (CdPA), called party number (CdPN), called party directory number (DN), redirect indicator (RDI), redirecting dialed number (RDN), and a bearer capabilities indicator.

4. The method of claim 1 wherein receiving a voicemail routing query message includes receiving one of an intelligent network application part (INAP) initial detection point (IDP) query message and a customized applications for mobile networks enhanced logic (CAMEL) application part (CAP) query message.

5. The method of claim 1 wherein determining voicemail routing information includes performing a lookup in a database including voicemail routing information and being indexed by voicemail query parameters.

6. The method of claim 5 wherein performing a lookup in a database includes performing a lookup in a database including at least one range-based entry for associating a range of subscriber identifiers with a voicemail server and at least one exception-based entry for associating an individual subscriber identifier with a voicemail server.

7. The method of claim 1 wherein determining voicemail routing information based on at least one query message parameter includes determining a voicemail server center (VMSC) identifier (ID), where the VMSC ID identifies a VMSC, determining a voicemail (VM) index identifying a voicemail service, and based on the VMSC ID and the VM index, determining the voicemail routing number.

8. The method of claim 1 wherein generating a voicemail routing response message includes generating at least one of an intelligent network application part (INAP) response message and a customized applications for mobile networks enhanced logic (CAMEL) application part (CAP) response message.

9. A method for providing voicemail routing information, the method comprising:
receiving a voicemail routing query message including at least one parameter associated with a session initiation protocol (SIP) transaction, wherein the voicemail routing query message is associated with a subscriber of one or more advanced voicemail services;
determining voicemail routing information based on the at least one query message parameter, wherein the voicemail routing information identifies a voicemail server configured to perform and provide the one or more advanced voicemail services, wherein the voicemail routing information includes a voicemail routing number that identifies a voicemail server and a voicemail service, and wherein determining the voicemail routing information based on the at least one query message parameter includes identifying the voicemail server among a plurality of voicemail servers where at least some of the voicemail servers provide different services, wherein the at least one query parameter includes a subscriber identifier and a call condition, wherein the call condition indicates whether a voicemail call is associated with a voicemail deposit or a voicemail retrieval transaction and wherein each of the plurality of voicemail servers has unique routing information; and
generating a voicemail routing response message including the determined voicemail routing information.

10. The method of claim 9 wherein receiving a voicemail routing query message includes receiving a message containing at least one of a called party identifier, a media type, and a cause code.

11. The method of claim 10 wherein receiving a voicemail routing query message includes reading a message containing one of an audio media type, a video media type, and a text media type.

12. The method of claim 10 wherein receiving a voicemail routing query message includes reading a message at least one of a busy 486 cause code, an unknown/not available 404 cause code, a no reply 408 cause code, a unconditional 302 cause code, a deflection during alerting 487 cause code, a deflection immediate response 480 cause code, and a mobile subscriber not reachable 503 cause code.

13. The method of claim 9 wherein determining voicemail routing information includes determining a transaction type that includes one of a default transaction, a deposit transaction, and a retrieval transaction and a media transaction type that includes one of a video voicemail transaction, an audio voicemail transaction, and a text voicemail transaction.

14. A method for routing a session initiation protocol (SIP) signaling message to a voicemail server, the method comprising:
receiving a SIP signaling message that includes at least one parameter associated with a SIP transaction, wherein the SIP signaling message is associated with a subscriber of one or more advanced voicemail services;
determining voicemail routing information based on the at least one SIP signaling message parameter, wherein the voicemail routing information identifies a voicemail server configured to perform and provide the one or more advanced voicemail services, wherein the voicemail routing information includes a voicemail routing number that identifies the voicemail server and a voicemail service, and wherein determining the voicemail routing information based on the at least one SIP signaling message parameter includes identifying the voicemail server among a plurality of voicemail servers where at least some of the voicemail servers provide different services, wherein the at least one SIP signaling message parameter includes a subscriber identifier and a call condition, wherein the call condition indicates whether a voicemail call is associated with a voicemail deposit or a voicemail retrieval transaction and wherein each of the plurality of voicemail servers has unique routing information; and
forwarding the SIP signaling message to the identified voicemail server.

15. The method of claim 14 wherein receiving a SIP signaling message includes receiving a SIP Invite message.

16. The method of claim 14 wherein receiving a SIP signaling message includes receiving a SIP signaling message containing at least one of a called party identifier, a media type, and a cause code.

17. The method of claim 15 wherein receiving a SIP signaling message includes receiving a SIP signaling message containing one of an audio media type, a video media type, and a text media type.

18. The method of claim 15 wherein receiving a SIP signaling message includes receiving a SIP signaling message including one of a busy 486 cause code, an unknown/not available 404 cause code, a no reply 408 cause code, a unconditional 302 cause code, a deflection during alerting 487 cause code, a deflection immediate response 480 cause code, and a mobile subscriber not reachable 503 cause code.

19. The method of claim 14 wherein determining voicemail routing information includes determining a transaction type that includes one of a default transaction, a deposit transaction, and a retrieval transaction and a media transaction type that includes one of a video voicemail transaction, an audio voicemail transaction, and a text voicemail transaction.

20. The method of claim 14 wherein forwarding the SIP signaling message includes modifying the SIP signaling message to include the voicemail routing information and forwarding the SIP signaling message to the voicemail server.

21. A method for triggerlessly providing voicemail routing information, the method comprising:
receiving a first integrated services digital network user part (ISUP) signaling message that includes at least one parameter associated with an advanced voicemail service, wherein the first ISUP signaling message is associated with a subscriber of one or more advanced voicemail services;
determining voicemail routing information based on the at least one ISUP signaling message parameter, wherein the voicemail routing information identifies a voicemail server configured to perform and provide the one or more advanced voicemail services, wherein the voicemail routing information includes a voicemail routing number that identifies the voicemail server and a voicemail service, and wherein determining the voicemail routing information based on the at least one ISUP signaling message parameter includes identifying the voicemail server among a plurality of voicemail servers where at least some of the voicemail servers provide different services, wherein the at least one ISUP signaling message parameter includes a subscriber identifier and a call condition, wherein the call condition indicates whether a voicemail call is associated with a voicemail deposit or a voicemail retrieval transaction and wherein each of the plurality of voicemail servers has unique routing information;

terminating the first received ISUP signaling message;

generating and transmitting an ISUP response message that includes the determined voicemail routing information;

receiving a second ISUP signaling message that includes the determined voicemail routing information; and forwarding the second ISUP signaling message to the identified voicemail server.

22. A method for triggerlessly providing voicemail routing information, the method comprising:

intercepting an integrated services digital network user part (ISUP) signaling message that includes at least one parameter associated with an advanced voicemail transaction, wherein the ISUP signaling message is associated with a subscriber of one or more advanced voicemail services;

determining voicemail routing information based on the at least one ISUP signaling message parameter, wherein the voicemail routing information identifies a voicemail server configured to perform and provide the one or more advanced voicemail services, and wherein determining the voicemail routing information based on the at least one ISUP signaling message parameter includes identifying the voicemail server among a plurality of voicemail servers where at least some of the voicemail servers provide different services, wherein the at least one ISUP signaling message parameter includes a subscriber identifier and a call condition, wherein the call condition indicates whether a voicemail call is associated with a voicemail deposit or a voicemail retrieval transaction and wherein each of the plurality of voicemail servers has unique routing information;

modifying the ISUP signaling message to include the determined voicemail routing information; and forwarding the modified ISUP signaling message to the identified voicemail server.

23. An advanced voicemail routing node for providing voicemail routing information, the node comprising:

a communications module configured to receive a voicemail routing query message including at least one query message parameter associated with a voicemail transaction, wherein the voicemail routing query message is associated with a subscriber of one or more advanced voicemail services; and a voicemail routing module configured to determine voicemail routing information based on the at least one query message parameter, wherein the voicemail routing information identifies a voicemail server configured to perform and provide the one or more advanced voicemail services, wherein the voicemail routing information includes a voicemail routing number that identifies the voicemail server and a voicemail service, and to generate a voicemail routing response message including the determined voicemail routing information, wherein the voicemail routing module is configured to determine the voicemail routing information based on the at least one query message parameter by identifying the voicemail server among a plurality of voicemail servers where at least some of the voicemail servers provide different services, wherein the at least one query parameter includes a subscriber identifier and a call condition, wherein the call condition indicates whether a voicemail call is associated with a voicemail deposit or a voicemail retrieval transaction and wherein each of the plurality of voicemail servers has unique routing information.

24. The advanced voicemail routing node of claim 23 wherein the communications module is configured to receive the voicemail routing query message from a mobile switching center (MSC).

25. The advanced voicemail routing node of claim 23 wherein the voicemail routing query message contains at least another query parameter selected from the group consisting of a message transfer part (MTP) originating point code (OPC), MTP destination point code (DPC), SCCP called party (CdPA), called party number (CdPN), directory number (DN), redirect indicator (RDI), original called number (OCN), redirecting dialed number (RDN), and a bearer capabilities indicator.

26. The advanced voicemail routing node of claim 23 wherein the communication module is configured to receive at least one of an intelligent network application part (INAP) initial detection point (IDP) voicemail routing query message and a customized applications for mobile networks enhanced logic (CAMEL) application part (CAP) voicemail routing query message.

27. The advanced voicemail routing node of claim 23 comprising a database including voicemail routing information and being indexed by voicemail query parameters.

28. The advanced voicemail routing node of claim 27 wherein the database includes at least one range-based entry for associating a range of subscriber identifiers with a voicemail server and at least one exception-based entry for associating an individual subscriber identifier with a voicemail server.

29. The advanced voicemail routing node of claim 23 wherein the voicemail routing module is configured to determine a voicemail server center (VMSC) identifier (ID), where the VMSC ID identifies a VMSC, and to determine a voicemail (VM) index identifying a voicemail service, and to determine the voicemail routing number based on the VMSC ID and VM index.

30. The advanced voicemail routing node of claim 23 wherein the voice mail routing information module is configured to generate at least one of an intelligent network application part (INAP) voicemail routing response message and a customized applications for mobile networks enhanced logic (CAMEL) application part (CAP) voicemail routing response message.

31. An advanced voicemail routing node for providing voicemail routing information, the node comprising:

a communications module configured to receive a voicemail routing query message including at least one parameter associated with a session initiation protocol (SIP) transaction, wherein the voicemail routing query message is associated with a subscriber of one or more advanced voicemail services; and a voicemail routing module configured to determine voicemail routing information based on the at least one query message parameter, wherein the voicemail routing information identifies a voicemail server configured to perform and provide the one or more advanced voicemail services, wherein the voicemail routing information includes a voicemail routing number that identifies the voicemail server and a voicemail service, and to generate a voicemail routing response message including the determined voicemail routing information, wherein the voicemail routing module is configured to determine the voicemail routing information based on the at least one query message parameter by identifying the voicemail server among a plurality of voicemail servers where at least some of the voicemail servers provide different services, wherein the at least one query parameter includes a subscriber identifier and a call condition, wherein the call condition indicates whether a voicemail call is associated with a voicemail deposit or a voicemail retrieval transaction and wherein each of the plurality of voicemail servers has unique routing information.

32. The advanced voicemail routing node of claim 31 wherein the communications module is configured to receive a voicemail routing query message containing at least one of a called party identifier, a media type, and a cause code.

33. The advanced voicemail routing node of claim 32 wherein the communications module is configured to receive a voicemail routing query message containing one of an audio media type, a video media type, and a text media type.

34. The advanced voicemail routing node of claim 32 wherein the communications module is configured to receive a voicemail routing query message containing one of a busy 486 cause code, an unknown/not available 404 cause code, a no reply 408 cause code, a unconditional 302 cause code, a deflection during alerting 487 cause code, a deflection immediate response 480 cause code, and a mobile subscriber not reachable 503 cause code.

35. The advanced voicemail routing node of claim 31 wherein the voicemail routing module is configured to determine a transaction type that includes one of a default transaction, a deposit transaction, and a retrieval transaction and to determine a media transaction type that includes at least one of a video voicemail transaction, an audio voicemail transaction, and a text voicemail transaction.

36. An advanced voicemail routing node for routing a session initiation protocol (SIP) signaling message to a voicemail server, the node comprising:
a communications module configured to receive a SIP signaling message that includes at least one parameter associated with a SIP transaction, wherein the SIP signaling message is associated with a subscriber of one or more advanced voicemail services; and
a voicemail routing module configured to determine voicemail routing information based on the at least one SIP signaling message parameter, wherein the voicemail routing information identifies a voicemail server configured to perform and provide the one or more advanced voicemail services, wherein the voicemail routing information includes a voicemail routing number that identifies the voicemail server and a voicemail service, and to forward the SIP signaling message to the identified voicemail server, wherein the voicemail routing module is configured to determine the voicemail routing information based on the at least one SIP signaling message parameter by identifying the voicemail server among a plurality of voicemail servers where at least some of the voicemail servers provide different services, wherein the at least one SIP signaling message parameter includes a subscriber identifier and a call condition, wherein the call condition indicates whether a voicemail call is associated with a voicemail deposit or a voicemail retrieval transaction and wherein each of the plurality of voicemail servers has unique routing information.

37. The advanced voicemail routing node of claim 36 wherein the communications module is configured to receive a SIP Invite message.

38. The advanced voicemail routing node of claim 36 wherein the communications module is configured to receive a SIP signaling message containing at least one of a called party identifier, a media type, and a cause code.

39. The advanced voicemail routing node of claim 37 wherein the communications module is configured to receive a SIP signaling message containing one of an audio media type, a video media type, and a text media type.

40. The advanced voicemail routing node of claim 37 wherein the communications module is configured to receive a SIP signaling message including one of a busy 486 cause code, an unknown/not available 404 cause code, a no reply 408 cause code, a unconditional 302 cause code, a deflection during alerting 487 cause code, a deflection immediate response 480 cause code, and a mobile subscriber not reachable 503 cause code.

41. The advanced voicemail routing node of claim 36 wherein the voicemail routing module is configured to determine a transaction type that includes one of a default transaction, a deposit transaction, and a retrieval transaction and a media transaction type that includes one of a video voicemail transaction, an audio voicemail transaction, and a text voicemail transaction.

42. The advanced voicemail routing node of claim 36 wherein the voicemail routing module is configured to modify the SIP signaling message to include the voicemail routing information and to forward the SIP signaling message to the voicemail server.

43. An advanced voicemail routing node for triggerlessly providing voicemail routing information, the node comprising:
a communications module configured to receive a first integrated services digital network user part (ISUP) signaling message that includes at least one parameter associated with an advanced voicemail service, wherein the first ISUP signaling message is associated with a subscriber of one or more advanced voicemail services, to terminate the first received ISUP signaling message, and to receive a second ISUP signaling message that includes determined voicemail routing information; and
a voicemail routing module configured to determine voicemail routing information based on the at least one ISUP signaling message parameter, wherein the voicemail routing information identifies a voicemail server configured to perform and provide the one or more advanced voicemail services, wherein the voicemail routing information includes a voicemail routing number that identifies the voicemail server and a voicemail service, to generate and transmit an ISUP response message that includes the determined voicemail routing information, and to forward the second ISUP signaling message to the identified voicemail server, wherein the voicemail routing module is configured to determine the voicemail routing information based on the at least one ISUP signaling message parameter by identifying the voicemail server among a plurality of voicemail servers where at least some of the voicemail servers provide different services, wherein the at least one ISUP signaling message parameter includes a subscriber identifier and a call condition, wherein the call condition indicates whether a voicemail call is associated with a voicemail deposit or a voicemail retrieval transaction and wherein each of the plurality of voicemail servers has unique routing information.

44. An advanced voicemail routing node for triggerlessly providing voicemail routing information, the node comprising:
a communications module configured to intercept an integrated services digital network user part (ISUP) signaling message that includes at least one parameter associated with an advanced voicemail transaction, wherein the ISUP signaling message is associated with a subscriber of one or more advanced voicemail services; and a voicemail routing module configured to determine voicemail routing information based on the at least one ISUP signaling message parameter, wherein the voicemail routing information identifies a voicemail server configured to perform and provide the one or more advanced voicemail services, wherein the voicemail routing information includes a voicemail routing number that identifies the voicemail server and a voicemail service, modify the ISUP signaling message to include the determined voicemail routing information, and forward the modified ISUP signaling message to the identified voicemail server, wherein the voicemail routing module is configured to determine the voicemail routing information based on the at least one ISUP signaling message parameter by identifying the voicemail server among a plurality of voicemail servers where at least some of the voicemail servers provide different services, wherein the at least one ISUP signaling message parameter includes a subscriber identifier and a call condition, wherein the call condition indicates whether a voicemail call is associated with a voicemail deposit or a voicemail retrieval transaction.

45. A computer program product comprising computer executable instructions embodied in a non-transitory computer readable medium for performing steps comprising:
receiving a voicemail routing query message including at least one query message parameter associated with a voicemail transaction, wherein the voicemail routing query message is associated with a subscriber of one or more advanced voicemail services;
determining voicemail routing information based on the at least one query message parameter, wherein the voicemail routing information identifies a voicemail server configured to perform and provide the one or more advanced voicemail services, wherein the voicemail routing information includes a voicemail routing number that identifies the voicemail server and a voicemail service, and wherein determining the voicemail routing information based on the at least one query message parameter includes identifying the voicemail server among a plurality of voicemail servers where at least some of the voicemail servers provide different services, wherein the at least one query message parameter includes a subscriber identifier and a call condition, wherein the call condition indicates whether a voicemail call is associated with a voicemail deposit or a voicemail retrieval transaction and wherein each of the plurality of voicemail servers has unique routing information; and
generating a query response message including the determined voicemail routing information.

46. A computer program product comprising computer executable instructions embodied in a non-transitory computer readable medium for performing steps comprising:
receiving a voicemail routing query message including at least one parameter associated with a session initiation protocol (SIP) transaction, wherein the voicemail routing query message is associated with a subscriber of one or more advanced voicemail services;
determining voicemail routing information based on the at least one query message parameter, wherein the voicemail routing information identifies a voicemail server configured to perform and provide the one or more advanced voicemail services, wherein the voicemail routing information includes a voicemail routing number that identifies the voicemail server and a voicemail service, and wherein determining the voicemail routing information based on the at least one query message parameter includes identifying the voicemail server among a plurality of voicemail servers where at least some of the voicemail servers provide different services, wherein the at least one query message parameter includes a subscriber identifier and a call condition, wherein the call condition indicates whether a voicemail call is associated with a voicemail deposit or a voicemail retrieval transaction and wherein each of the plurality of voicemail servers has unique routing information; and
generating a voicemail routing response message including the determined voicemail routing information.

47. A computer program product comprising computer executable instructions embodied in a non-transitory computer readable medium for performing steps comprising:
receiving a session initiation protocol (SIP) signaling message that includes at least one parameter associated with a SIP transaction, wherein the SIP signaling message is associated with a subscriber of one or more advanced voicemail services;
determining voicemail routing information based on the at least one SIP signaling message parameter, wherein the voicemail routing information identifies a voicemail server configured to perform and provide the one or more advanced voicemail services, wherein the voicemail routing information includes a voicemail routing number that identifies the voicemail server and a voicemail service, and wherein determining the voicemail routing information based on the at least one SIP signaling message parameter includes identifying the voicemail server among a plurality of voicemail servers where at least some of the voicemail servers provide different services, wherein the at least one SIP signaling message parameter includes a subscriber identifier and a call condition, wherein the call condition indicates whether a voicemail call is associated with a voicemail deposit or a voicemail retrieval transaction and wherein each of the plurality of voicemail servers has unique routing information; and
forwarding the SIP signaling message to the identified voicemail server.

48. A computer program product comprising computer executable instructions embodied in a non-transitory computer readable medium for performing steps comprising:
receiving a first integrated services digital network user part (ISUP) signaling message that includes at least one parameter associated with an advanced voicemail service, wherein the first ISUP signaling message is associated with a subscriber of one or more advanced voicemail services;
determining voicemail routing information based on the at least one ISUP signaling message parameter, wherein the voicemail routing information identifies a voicemail server configured to perform and provide the one or more advanced voicemail services, wherein the voicemail routing information includes a voicemail routing number that identifies the voicemail server and a voicemail service, and wherein determining the voicemail routing information based on the at least one ISUP signaling message parameter includes identifying the voicemail server among a plurality of voicemail servers where at least some of the voicemail servers provide different services, wherein the at least one ISUP signaling message parameter includes a subscriber identifier and a call condition, wherein the call condition indicates whether a voicemail call is associated with a voicemail deposit or a voicemail retrieval transaction and wherein each of the plurality of voicemail servers has unique routing information;

terminating the first received ISUP signaling message;

generating and transmitting an ISUP response message that includes the determined voicemail routing information;

receiving a second ISUP signaling message that includes the determined voicemail routing information; and forwarding the second ISUP signaling message to the identified voicemail server.

49. A computer program product comprising computer executable instructions embodied in a non-transitory computer readable medium for performing steps comprising:

intercepting an integrated services digital network user part (ISUP) signaling message that includes at least one parameter associated with an advanced voicemail transaction, wherein the ISUP signaling message is associated with a subscriber of one or more advanced voicemail services;

determining voicemail routing information based on the at least one ISUP signaling message parameter, wherein the voicemail routing information identifies a voicemail server configured to perform and provide the one or more advanced voicemail services, wherein the voicemail routing information includes a voicemail routing number that identifies the voicemail server and a voicemail service, and wherein determining the voicemail routing information based on the at least one ISUP signaling message parameter includes identifying the voicemail server among a plurality of voicemail servers where at least some of the voicemail servers provide different services, wherein the at least one ISUP signaling message parameter includes a subscriber identifier and a call condition, wherein the call condition indicates whether a voicemail call is associated with a voicemail deposit or a voicemail retrieval transaction and wherein each of the plurality of voicemail servers has unique routing information;

modifying the ISUP signaling message to include the determined voicemail routing information; and forwarding the modified ISUP signaling message to the identified voicemail server.

\* \* \* \* \*